United States Patent
Liu et al.

(10) Patent No.: US 11,619,608 B2
(45) Date of Patent: Apr. 4, 2023

(54) COMPOSITIONS, METHODS, KITS AND DEVICES FOR MOLECULAR ANALYSIS

(71) Applicants: LIFE TECHNOLOGIES CORPORATION, Carlsbad, CA (US); INTEGENX INC., Carlsbad, CA (US)

(72) Inventors: Jen-Kuei Liu, Palo Alto, CA (US); Bharti Solanki, Antioch, CA (US); Hans Michael Wenz, Redwood City, CA (US); Frank Mercer, Belmont, CA (US); Cevat Akin, San Bruno, CA (US); Achim Karger, Foster City, CA (US); Annelise Barron, Woodside, CA (US); Scott Mack, Boulder Creek, CA (US)

(*) Notice: Subject to any disclaimer, the term of this patent is extended or adjusted under 35 U.S.C. 154(b) by 602 days.

(21) Appl. No.: 16/615,804

(22) PCT Filed: May 22, 2018

(86) PCT No.: PCT/US2018/033972
§ 371 (c)(1),
(2) Date: Nov. 21, 2019

(87) PCT Pub. No.: WO2018/217816
PCT Pub. Date: Nov. 29, 2018

(65) Prior Publication Data
US 2020/0141901 A1    May 7, 2020

Related U.S. Application Data

(60) Provisional application No. 62/675,057, filed on May 22, 2018, provisional application No. 62/509,560, filed on May 22, 2017.

(51) Int. Cl.
| | |
|---|---|
| C02F 1/40 | (2006.01) |
| C02F 11/00 | (2006.01) |
| C08G 61/04 | (2006.01) |
| G01N 27/447 | (2006.01) |
| C08L 33/26 | (2006.01) |

(52) U.S. Cl.
CPC ........ *G01N 27/44747* (2013.01); *C08L 33/26* (2013.01); *C08L 2203/02* (2013.01); *C08L 2205/025* (2013.01)

(58) Field of Classification Search
CPC .............. G01N 27/44747; C08L 33/26; C08L 2205/025; C08L 2203/02
USPC ...................... 204/605, 601, 600, 193; 520/1
See application file for complete search history.

(56) References Cited

U.S. PATENT DOCUMENTS

| | | | |
|---|---|---|---|
| 7,828,948 B1 * | 11/2010 | Hatch | G01N 27/44791 |
| | | | 204/605 |
| 2006/0108225 A1 * | 5/2006 | Carson | G01N 27/44747 |
| | | | 204/605 |
| 2013/0001084 A1 * | 1/2013 | Dolnik | G01N 27/44747 |
| | | | 204/468 |

FOREIGN PATENT DOCUMENTS

| | | | | |
|---|---|---|---|---|
| CN | 1873405 | A | 12/2006 | |
| CN | 102276852 | A | 12/2011 | |
| EP | 0292837 | | 11/1988 | |
| EP | 0339678 | * | 4/1989 | |
| EP | 0339678 | | 11/1989 | |
| WO | WO-0067009 | A1 * | 11/2000 | ....... G01N 27/44747 |
| WO | WO-2000067009 | | 11/2000 | |

OTHER PUBLICATIONS

PCT/US2018/033939, Search Report and Written Opinion, dated Jan. 16, 2019.
PCT/US2018/033939, Partial Search Report, dated Nov. 6, 2018.
PCT/US2018/033972, Search Report and Written Opinion, dated Sep. 21, 2018.
Office Action received for Chinese Patent Application No. 201880033952 X, dated Mar. 3, 2022, 25 pages (19 pages of English Translation and 6 pages of Original Document).

* cited by examiner

*Primary Examiner* — Jessica Whiteley
(74) *Attorney, Agent, or Firm* — Workman Nydegger; Logan Christenson; John Guynn

(57) ABSTRACT

Provided herein is an electrophoresis separation medium comprising: (a) a non-crosslinked or sparsely cross-linked polymer or copolymer; (b) one or more denaturant compounds, in an amount sufficient to inhibit re-naturation of single stranded polynucleotides; (c) an aqueous solvent; (d) optionally, a wall-coating material suited to inhibition of electroosmotic flow; and (e) optionally, an organic water miscible solvent such as DMSO or acetonitrile, wherein the electrophoresis separation medium exhibits functional stability for at least seven days at 23° C. Also provided herein are sieving compositions, including polymer-based sieving compositions, for molecular sieving as well as related kits, devices and methods of use. Such compositions can be useful for separation of biomolecules such as nucleic acids, proteins, glycoproteins and glycans.

20 Claims, 23 Drawing Sheets

FIG. 1
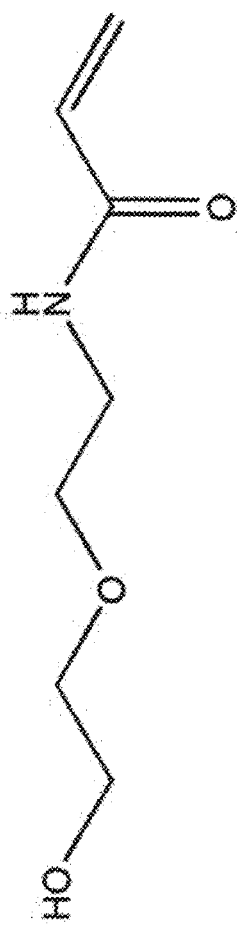
N-acryloyl-aminoethoxyethanol-substituted acrylamide
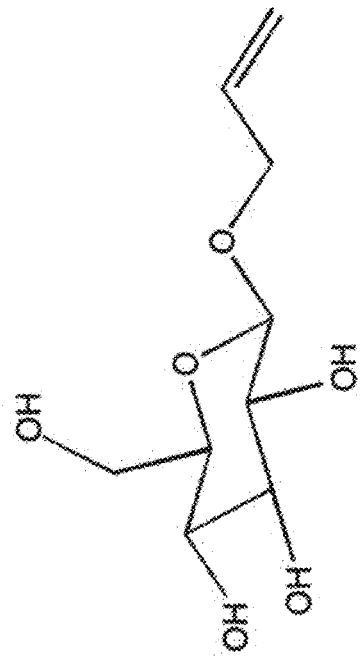
N-allyl glucose
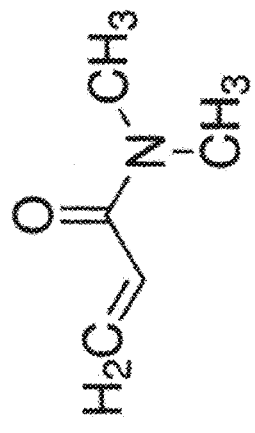
Dimethylacrylamide
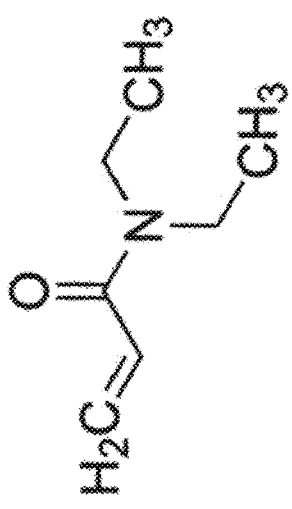
Diethylacrylamide FIG. 2
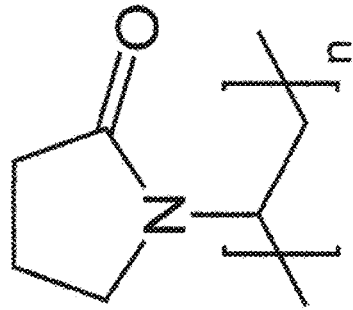
Polyvinylpyrrolidone (PVP), made from the monomer N-vinylpyrrolidone
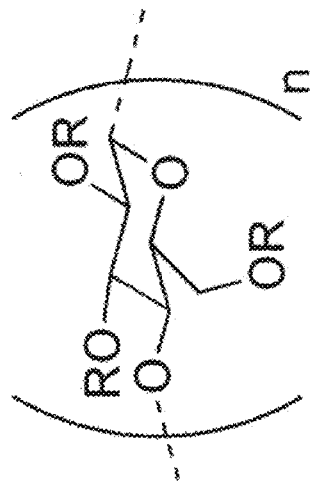
R = H or CH₂CH₂OH
Hydroxyethylcellulose

FIG. 3
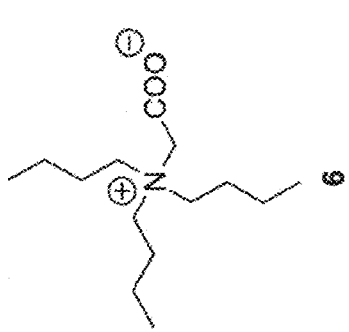
(4) Acetonitrile
(Mw 41.05)
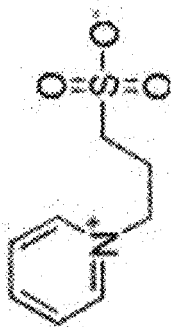
(5) 2-*N,N,N*-Tri-*n*-butylammonium acetate
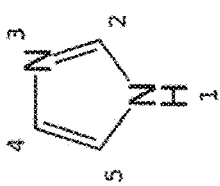
(6) 3-(1-pyridinio)-1-propanesulfonate
(7) Imidazole
(1) Betaine
(Mw 117.15)
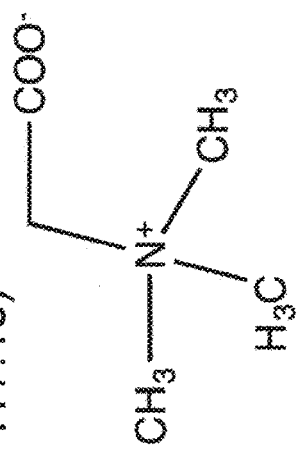
(2) Trehalose
(Mw 378.33)
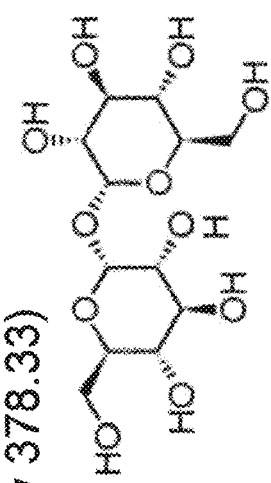
(3) L-Proline
(Mw 115.13)
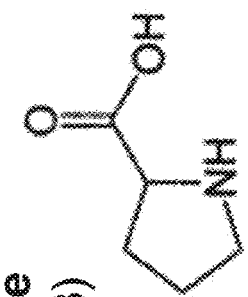

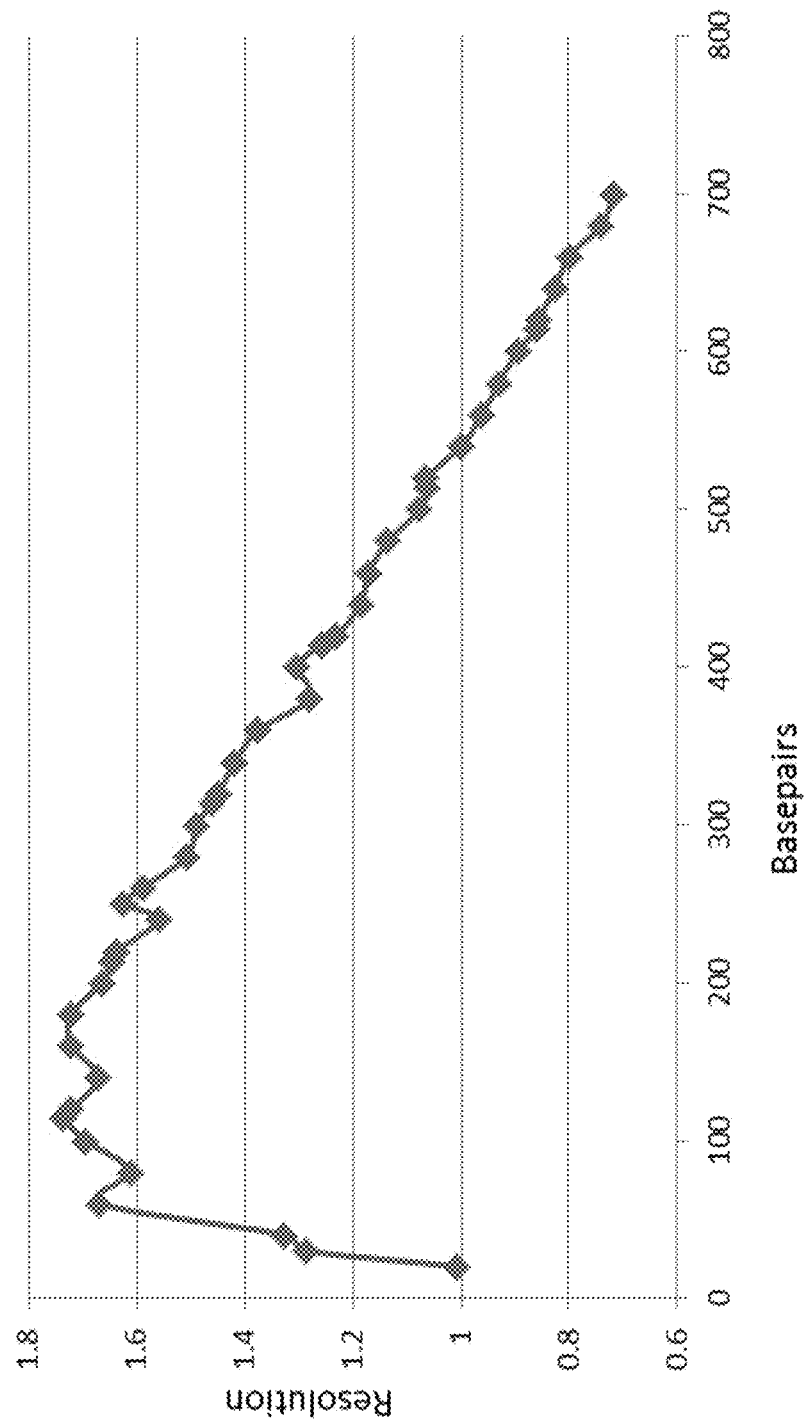

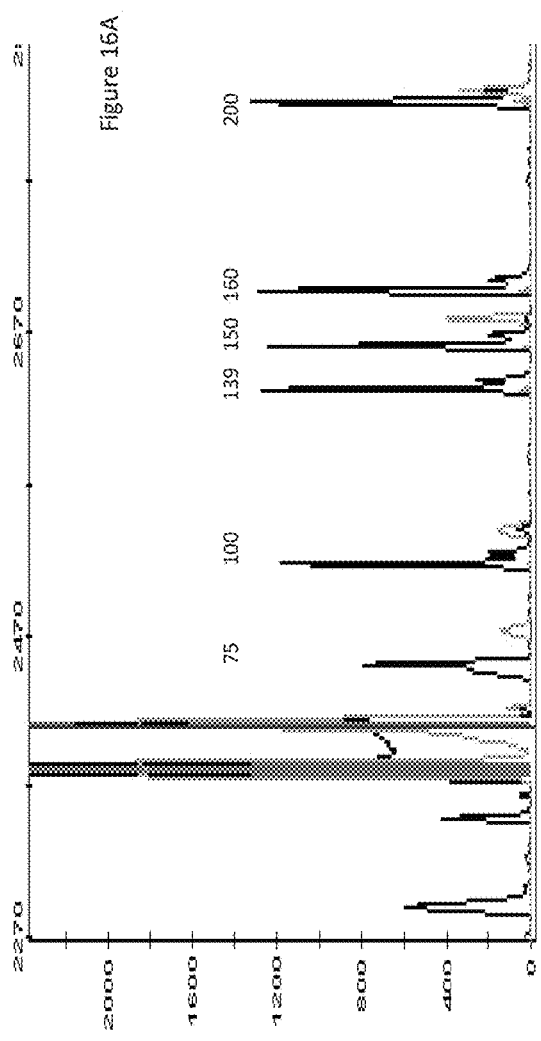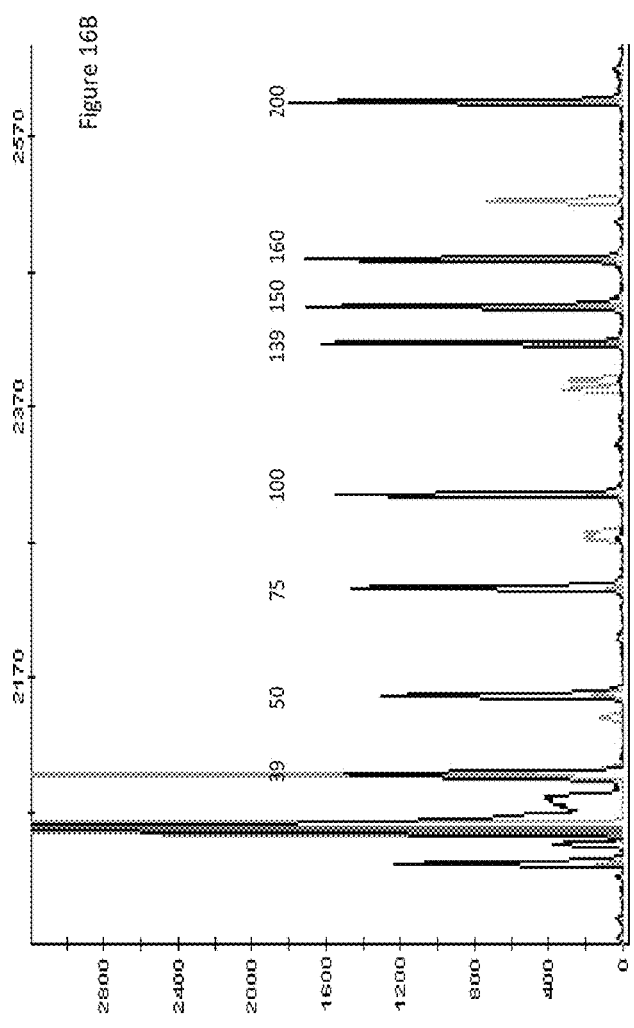

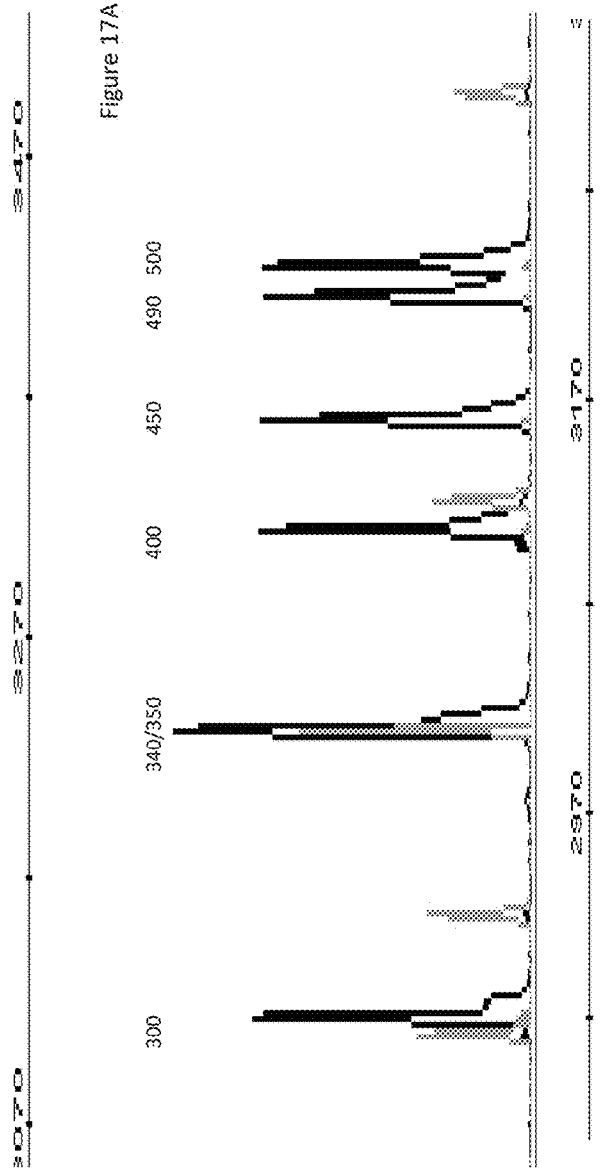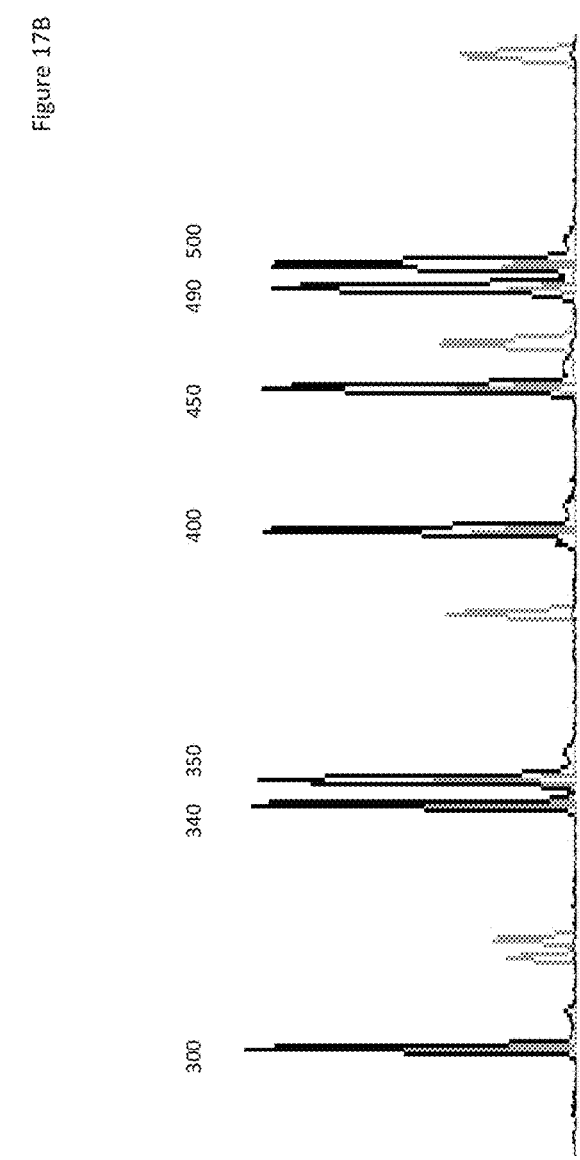

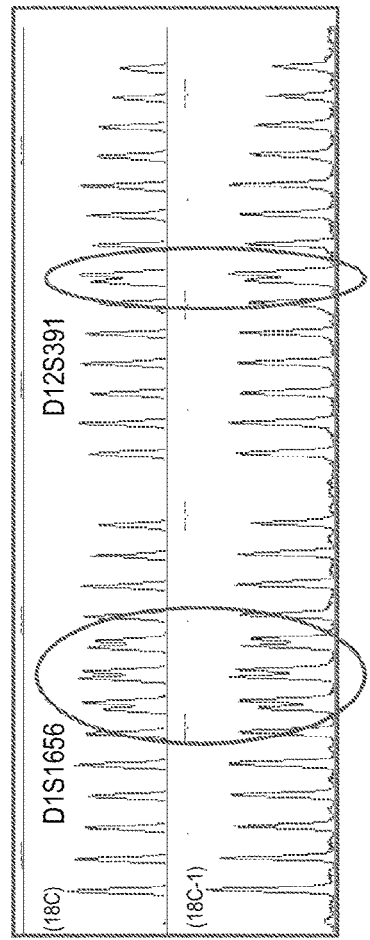
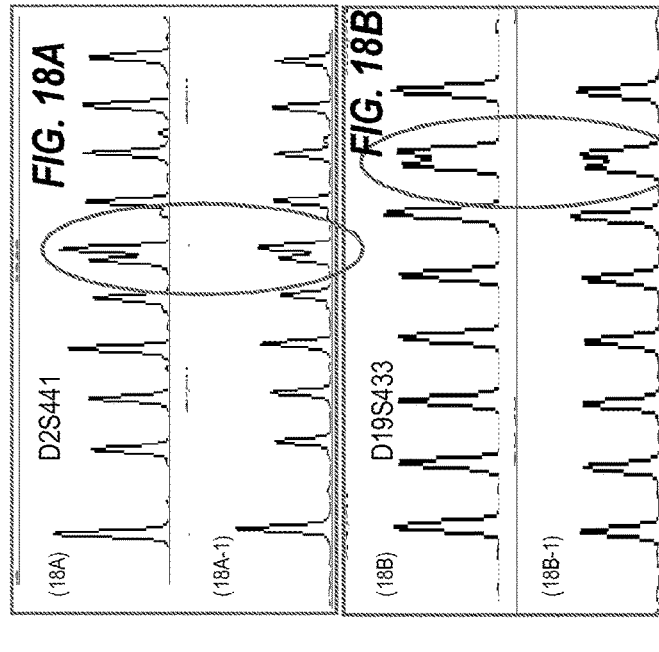

COMPOSITIONS, METHODS, KITS AND DEVICES FOR MOLECULAR ANALYSIS

REFERENCE TO RELATED APPLICATIONS

This application is a 371 National Phase of PCT/US2018/033972 filed May 22, 2018, which claims benefit under 35 U.S.C. § 119(e) U.S. Provisional Application Ser. No. 62/509,560 filed May 22, 2017, and to U.S. Provisional Application Ser. No. 62/675,057, filed on May 22, 2018. The entire contents of the aforementioned applications are incorporated by reference.

TECHNICAL FIELD

The present disclosure relates to sieving compositions including electrophoresis mediums, and formulations thereof. The present disclosure further relates to related systems, kits and components, such as electrophoresis capillaries, comprising the mediums, compositions, and formulations described herein. The present disclosure further relates to methods of using the mediums, compositions, and formulations described herein, in applications that employ biomolecular sieving including but not limited to capillary electrophoresis. This disclosure further provides, among other things, an electrophoresis separation medium. The mediums described herein are useful for separations, such as for separations of biomolecules (including but not limited to nucleic acids, proteins, glycoproteins and glycans), and the mediums exhibit a shelf life, particularly at room temperature or above, that is significantly longer than conventional compositions, including compositions containing urea as a denaturant.

BACKGROUND OF THE DISCLOSURE

Capillary electrophoresis (CE) instruments are useful for analysis of DNA samples, and are employed for, among other things, DNA sequencing, genotyping, and forensic genetic analyses. DNA analysis media for CE contain dissolved, water-soluble polymers, for instance, linear polyacrylamides, poly-N-substituted acrylamides, or poly-N,N-disubstituted acrylamides, which, at appropriate concentrations, are designed to form entangled polymer networks that physically "sieve" DNA molecules according to their size and shape during electrophoresis. Determination of DNA chain length and sequence by capillary electrophoresis in turn yields many kinds of valuable information.

DNA molecules of interest often are initially obtained in double-stranded, helical form ("dsDNA"). Yet for many applications it is preferable to analyze DNA by electrophoresis in single-stranded, denatured form ("ssDNA"). Typically, dsDNA is denatured before analysis by brief (e.g., 3-minute) exposure to high heat (e.g., about 95° C.) prior to injection into an electrophoresis device. Maintaining denaturation of single-stranded DNA fragments, especially of longer DNA molecules (>120 nucleotides in length) during the analysis, as necessary for useful separation according to DNA chain length, typically requires the presence of chemical denaturants in the electrophoresis medium.

One DNA denaturant commonly used for electrophoresis is urea (Hutton, J. R. (1977). "Renaturation kinetics and thermal stability of DNA in aqueous solutions of formamide and urea." *Nucleic Acids Research* 4(10): 3537-3555).

Such sieving media comprising polymer networks are also used to separate and identify other molecules, such as proteins, glycoproteins and glycans. For example, such molecules can be separated and identified by capillary electrophoresis.

Capillary array electrophoresis is a powerful concept allowing high-resolution separations of complex samples such as Sanger DNA sequencing and VNTR-based fragment analysis in multiple lanes to occur simultaneously. Multicolor fluorescence detection with side illumination of the array with a radially-focused excitation laser beam is common in these applications. One challenge of this configuration can be the uniform illumination across all the capillaries in the array. Using side illumination, the efficiency of laser light propagation though an array of fused-silica capillaries arranged in a planer fashion and filled with separation medium can be dependent on optical factors that the array arrangement presents to the light of the laser beam. Such factors include, but are not limited to, capillary-to-spacing, capillary curvature (inner- and outer capillary diameters), and the differences in refractive index (RI) at the many interfaces in the excitation light path created by the three phases air, fused-silica and separation media. Various strategies are known in the art to reduce the refractive index differences at these optical interfaces in order to eliminate or reduce the lensing effects at the interfaces, such as square-profile CE capillaries, immersing the array in an 'index-matching liquid', and matching the refractive index of the separation media as close as possible to that of the fused-silica material that makes up the wall of the capillaries. In many currently available commercial separation polymers, such as the POP®-4, -6 and -7 line of separation polymers, matching of the refractive index is largely based on the presence of highly concentrated (approx. 8M) urea in the separation polymer.

However, urea has a degree of chemical instability in aqueous media at pH 7-8. Degradation of urea can result in pH drift of the electrophoresis medium and the introduction of bubbles, which impede electric current and degrade function and performance of the medium. The tendency of urea to chemically degrade during storage, especially at room temperature, is one reason why CE separation media generally are stored at 4° C., and is a major cause of the shortening of separation matrix "shelf life" to (typically) less than 6 months, even in a refrigerator. Furthermore, polymer formulations prepared with urea have a limited use time of about 1-2 weeks after being installed on an instrument.

Spontaneous hydrolytic degradation or alteration of DNA separation matrix polymers can also play a role in CE matrix instability. The most common type of water-soluble polymer used for DNA electrophoresis is linear polyacrylamide, which is normally a charge-neutral polymer. However, polyacrylamide is labile to hydrolysis at pH 8, the typical buffer pH used for DNA electrophoresis. If a polyacrylamide separation matrix is allowed to remain at room temperature for a significant period of time (24 hours or longer), or kept at 4° C. for more than about six months, then amide groups within polymer side chains can react spontaneously with water molecules via hydrolysis, chemically modifying the reacted side chains into negatively charged acrylic acid groups. Negative charges created on the polymer make it an inferior DNA separation matrix. The hydrolyzed, negatively charged polymers can migrate in an applied electric field, or create local electroosmotic flows of electrophoresis buffer; the user then will observe broader DNA peaks, which make it more difficult to extract the desired data and information from the analytical DNA separation.

For example, if the known urea-containing formulations are stored at room temperature or left on an instrument for more than 2 weeks, the formulations begin to degrade. As a result, the resolution observed during capillary electrophoresis begins to decline, and the electrical conductivity of the formulations increases. Aging the polymer formulations containing Urea at 37° C. accelerates this degradation and after 2 weeks at 37° C., the formulations display electrical conductivities 3 to 4 times higher than unaged formulations. If the electrical conductivity changes with time, resolution observed during capillary electrophoresis can be degraded.

Other chemical denaturants of biomolecules (such as DNA) include N-methyl-2-pyrrolidinone, 6-caprolactam and N-methyl-caprolactam (U.S. Pat. No. 6,051,636, Johnson et al., "Entrapment of Nucleic Acid Sequencing Template In Sample Mixtures By Entangled Polymer Networks" (2000)), as well as guanidinium hydrochloride, dimethylformamide (DMF), dimethyl sulfoxide (DMSO). Some of these denaturants, e.g., DMF, are relatively unstable over time in aqueous solution.

BRIEF SUMMARY OF THE DISCLOSURE

In one aspect disclosed herein is a stable separation matrix for capillary electrophoresis, in particular for electrophoresis of DNA, which can be stored at room temperature or above for extended periods of time, without suffering deleterious degradation in its DNA separation performance for analytical applications such as DNA sequencing, genotyping, or forensic analysis. The separation matrix combines the use of hydrolytically stable chemical denaturants for DNA, with dissolved DNA sieving polymers or copolymers that are also stable to hydrolysis at pH 8 over extended periods of time.

In one aspect, this disclosure provides an electrophoresis separation medium comprising: (a) a non-crosslinked or sparsely cross-linked polymer or copolymer; (b) one or more denaturant compounds, in an amount sufficient to inhibit re-naturation of single stranded polynucleotides; (c) an aqueous solvent; (d) optionally, a wall-coating material suited to inhibition of electroosmotic flow; and (e) optionally, an organic water miscible solvent such as DMSO or acetonitrile, wherein the electrophoresis separation medium exhibits functional stability for at least seven days at 23° C. In one embodiment, the polymer or co-polymer comprises a mono-N-substituted acrylamide monomer or a di-N-substituted acrylamide monomer. In another embodiment the polymer or co-polymer comprises one or more acrylamide monomers selected from dimethylacrylamide, diethylacrylamide, N-acryloyl-aminoethoxyethanol-substituted acrylamide (NAEE) monomer and N-allyl glucose monomer (NAGL). In another embodiment the polymer or co-polymer comprises a polyvinylpyrrolidone. In another embodiment the polymer or co-polymer comprises hydroxyethylcellulose. In another embodiment, the denaturant is selected from the group consisting of proline, histidine, betaine, trehalose, acetonitrile, imidazole, DMSO, N-methyl-2-pyrrolidinone, 3-(1-pyridinio)-1-propanesulfonate, and 2-N,N,N-Tri-n-butylammonium acetate. In another embodiment the polymers have a weight-average molar mass of at least 500,000 g/mol, e.g., between 3.5M g/mol and 5M g/mol. In another embodiment the medium comprises polymers in an amount between about 1.5% (w/v) and 8.0% (w/v), e.g., about 5.5% (w/v). In another embodiment the polymer or co-polymer is a linear polymer. In another embodiment the medium comprises a sparsely cross-linked polymer comprising $1\times10^{-8}$ mol % to about $1\times10^{-3}$ mol % cross-linking moiety. In another embodiment the medium is polymerized from a mixture containing less than about 0.1% (w/v) of a cross-linking moiety in the polymerization mixture. In another embodiment the polymer is a homo-polymer or co-polymer of one or more N-substituted acrylamide monomers selected from dimethylacrylamide, diethylacrylamide, N-acryloyl-aminoethoxyethanol-substituted acrylamide (NAEE) monomer and N-allyl glucose ("NAG") monomer. In another embodiment, the polymer comprises at least any of 80%, 85%, 90% 95%, 97% or 99% w/w dimethylacrylamide monomer. In another embodiment the polymer further comprises between about 1% and 20% w/w diethylacrylamide monomers. In another embodiment the polymer further comprises between about 1% and about 10% w/w N-acryloyl-aminoethoxyethanol-substituted acrylamide (NAEE) monomer or N-allyl glucose monomer (e.g., about 3% w/w). In another embodiment the medium comprises between about 1% and about 10% w/w diethylacrylamide monomers. In another embodiment the polymer is a co-polymer comprising at least one acrylamide monomer other than dimethylacrylamide, diethylacrylamide, N-acryloyl-aminoethoxyethanol-substituted acrylamide (NAEE) monomer and N-allyl glucose monomer. In another embodiment the medium comprises a polymer blend. In another embodiment all the polymers in the blend are polymers selected from dimethylacrylamide, diethylacrylamide, N-acryloyl-aminoethoxyethanol-substituted acrylamide (NAEE) monomer and N-allyl glucose ("NAG") monomer. In another embodiment the medium comprises a plurality of denaturant compounds selected from the group consisting of proline, histidine, betaine, trehalose, acetonitrile, imidazole, DMSO, N-methyl-2-pyrrolidinone, 3-(1-pyridinio)-1-propanesulfonate, and 2-N,N,N-Tri-n-butylammonium acetate. In another embodiment the medium comprises the denaturant compound in an amount between about 0.2 M to 5.5 M, e.g., about 2M. In another embodiment the medium further comprises SDS or other ionic or non-ionic surfactants. In another embodiment the aqueous solvent comprises one or more pH-buffering salts. In another embodiment wherein the buffering salts is selected from Tris, TAPS, CHES, EDTA; Tris TAPS EDTA, Tris acetate EDTA, Tris borate EDTA and Tris CHES EDTA. In another embodiment the medium has a pH between about 7.0 and 8.5. In another embodiment the medium further comprises acetonitrile, e.g., at 4%-7% (v/v). In another embodiment the medium further comprises DMSO, e.g., at 0.3-5.0% (v/v). In another embodiment the medium comprises a capillary wall coating material. In another embodiment the wall-coating material is selected from pHEA, MCP-1 and a first and a second copolymerized monomers, said first monomer selected from a group consisting of acrylamide, methacrylamide, N-monosubstituted acrylamide, N-monosubstituted methacrylamide, N, N-disubstituted acrylamide, and N,N-disubstituted methacrylamide; and said second monomer selected from the group consisting of glycidyl group containing monomers, diol group containing monomers and allyl group containing carbohydrate monomers. In another embodiment the medium exhibits functional stability for capillary electrophoresis after storage at room temperature for at least any one month, six months or one year. In another embodiment the medium, after storage at room temperature for at least any of one day, one week, one month or six months, has no more than 2% of the polymers exhibiting carboxylic acid side chain moieties, e.g., resulting from hydrolysis. In another embodiment the medium is free, essentially free or substantially free of biomolecules (e.g., nucleic acids, DNA, RNA or polypeptides). In another embodiment, the medium is free, essentially free or substantially free of urea, N-methyl-2-pyrrolidinone, δ-caprolactam, N-methyl-caprolactam, guanidinium hydrochloride, dimethylformamide (DMF) and/or dimethyl sulfoxide (DMSO).

For other embodiments, copolymers of various derivatives of acrylamide and methacrylamide monomers with various glycidyl group containing monomers e.g., dimethylacrylamide and allyl glycidyl ether-epoxy poly(DMA)-, copolymers of various derivatives of acrylamide and methacrylamide with various allyl group containing carbohydrates and various glycidyl group containing monomers, such as allyl β-D-pyranoside (typically β-D-glucopyranoside) or allyl β-D-furanoside allyl glycidyl ether-epoxy poly(AG-AA) and copolymers of four different monomers including various acryl and methacrylamide, various allyl group containing carbohydrates, various glycidyl group containing monomer and various diol group containing monomer, such as acrylamide, allyl β-D-pyranoside (typically β-D-galactopyranoside or N-allylgluconamide) or allyl β-D-furanoside, allyl glycidyl ether and allyoxy-1,2 propanediol-epoxy poly(AGal-AA-APD). Such polymers are described in U.S. Pat. No. 6,410,668, the disclosure of which is hereby incorporated by reference in its entirety.

In another aspect, provided herein is a device comprising a solid substrate having microchannel filled with a separation medium as disclosed herein. In one embodiment the substrate comprises a plastic, glass or fused silica. In another embodiment the substrate is comprised in a microfluidic device. In another embodiment the substrate is an electrophoresis capillary. In another embodiment the substrate comprises a wall coated with a dynamically adsorbed coating or a covalently attached coating. In another embodiment the device further comprises electrodes in electrical communication with the medium. In another embodiment the device comprises at least one electrophoresis capillary. In another embodiment the device comprises a plurality of electrophoresis capillaries.

In another aspect, provided herein is a device comprising a syringe comprising a barrel comprising an internal space and a plunger fitted in the space, wherein the space contains a separation medium as disclosed herein. In one embodiment the plunger further comprises an anode or cathode that communicates with the internal space.

In another aspect, provided herein is a kit comprising a container containing a medium of as disclosed herein and a container containing an electrophoresis buffer.

In another aspect, provided herein is a system comprising a sample preparation module configured to perform DNA amplification or cycle sequencing; and a detection module comprising a solid substrate having microchannel filled with a separation medium as disclosed herein.

In another aspect, provided herein is a method comprising performing electrophoretic separation on a biomolecular analyte using a separation medium as disclosed herein. In one embodiment the method of further comprises, before electrophoresis, storing the separation medium for at least any of one day, one week, one month, six months or one year at a temperature between at least 15° C. and 40° C. In another embodiment the method is performed in a point-of-care setting, a police booking station or a combat zone. In another embodiment the method comprises storing the medium at a temperature of at least any of 20° C., 25° C. or 30° C. In another embodiment the analyte comprises a nucleic acid (e.g., DNA or RNA), a protein or a complex thereof. In another embodiment the analyte comprises DNA polynucleotides having an average size no more than about 1300 nucleotides. In another embodiment the analyte comprises DNA amplified from one or more STR loci, e.g., a forensic locus. In another embodiment the analyte comprises a DNA ladder. In another embodiment the method comprises injecting the medium into a microchannel of a microfluidic device or an electrophoresis capillary. In another embodiment the medium is stored in a microchannel of a microfluidic device or an electrophoresis capillary.

Additional embodiments, features, and advantages of the disclosure will be apparent from the following detailed description and through practice of the disclosure. The compositions, media, methods, systems, and kits of the present disclosure can be described as embodiments in any of the following enumerated clauses. It will be understood that any of the embodiments described herein can be used in connection with any other embodiments described herein to the extent that the embodiments do not contradict one another.

1. An electrophoresis separation medium comprising:
  (a) a sieving component comprising at least one polymer or copolymer;
  (b) optionally, one or more agents, and
  (c) an aqueous solvent or aqueous buffer;
  wherein the electrophoresis separation medium exhibits functional stability for capillary electrophoresis after storage at a temperature of at least about 23° C. for at least 14 days.

2. An electrophoresis separation medium comprising:
  (a) a sieving component comprising at least one polymer or copolymer;
  (b) optionally, one or more agents,
  (c) an aqueous solvent or aqueous buffer;
  wherein the electrophoresis separation medium is substantially free of urea.

3. An electrophoresis separation medium comprising:
  (a) a sieving component comprising at least one polymer or copolymer;
  (b) optionally, one or more agents,
  (c) an aqueous solvent or aqueous buffer;
  wherein the electrophoresis separation medium does not include urea.

4. The medium of any one of clauses 1 to 3, wherein the at least one polymer or copolymer is a non-crosslinked or sparsely cross-linked polymer or copolymer.

5. The medium of any one of clauses 1 to 3, wherein at least one polymer or copolymer is crosslinked.

6. The medium of any one of the preceding clauses, wherein the at least one polymer or copolymer is an uncharged water-soluble silica-adsorbing polymer or copolymer, a non-crosslinked acrylamide polymer or copolymer, a cellulose polymer or copolymer, a poly(alkylene oxide) polymer or copolymer, a polysaccharide, or a triblock copolymer.

7. The medium of any one of the preceding clauses, wherein the at least one polymer or copolymer is selected from the group consisting of linear polyacrylamide, polyethylene oxide, poly-N—N-dimethylacrylamide, polyvinylpyrrolidone, polyethylene glycol end capped with fluorocarbon tails, hydroxyethylcellulose, methylcellulose, hydroxypropylcellulose, hydroxypropylmethylcellulose, poly-N-acryloylaminopropanol, poly(N,N-dimethylacrylamide-co-N,N-dimethylacrylamide), poly(N-(acrylaminoethoxy)ethyl-β-D-glucopyranose), glucomannan, dextran, agarose, or poly-N-isopropylacrylamide.

8. The medium of any one of the preceding clauses, wherein the medium includes one or more agents that modifies the physical properties or the separation properties of the medium.

9. The medium of any one of the preceding clauses, wherein the medium includes one or more agents that is a denaturant, a compound capable of adjusting refractive index of the medium, a compound capable of slowing down the re-naturation kinetics of single-stranded DNA, or a compound capable of enhancing resolution of molecules by the medium.

10. The medium of any one of the preceding clauses, wherein the medium includes one or more agents that is a denaturant.

11. The medium of any one of the preceding clauses, wherein the medium includes one or more agents that is a compound capable of adjusting refractive index of the medium.

12. The medium of any one of the preceding clauses, wherein the medium includes one or more agents that is a compound capable of enhancing resolution of molecules by the medium.

13. The medium of any one of the preceding clauses, wherein the medium includes one or more agents selected from the group consisting of proline, histidine, betaine, trehalose, acetonitrile, imidazole, DMSO, N-methyl-2-pyrrolidinone, 3-(1-pyridinio)-1-propanesulfonate, 2-N,N,N-tri-n-butylammonium acetate, 1,3-dimethylurea, 1,3-diethylurea, ethylurea, methylurea, 1,1-dimethylurea, and 1,1-diethylurea.

14. The medium of any one of the preceding clauses, wherein the medium includes one or more agents that is a saccharide or its derivatives, a sugar alcohol or polyol or its derivatives, a sugars or a sugar isomer or its derivatives, a pentose sugar, a hexose sugar, a starch, a carbohydrate a starch hydrolysate, a hydrogenated starch hysdrolysate, glucose or its derivatives, galactose or its derivatives, sucrose or its derivatives, fructose or its derivatives, lactose or its derivatives, erythrose or its derivatives, arabinose or its derivatives, maltose or its derivatives, mannose or its derivatives, rhamnose or its derivatives, xylose or its derivatives, trehalose or its derivatives, sucralose or its derivatives, cellubiose or its derivatives, xylitol or its derivatives, lactulose or its derivatives, sorbitol or its derivatives, mannitol or its derivatives, maltitol or its derivatives, lactitol or its derivatives, erythritol or its derivatives, glycerol or its derivatives, glycogen or its derivatives, low molecular weight dextran or its derivatives, or a combination thereof.

15. The medium of clause 14, wherein the saccharide is a monosaccharide, a disaccharide, a trisaccharide, an oligosaccharide, or a polysaccharide.

16. The medium of clause 14, wherein the one or more agents is fructose, galactose, glucose, glycogen, trehalose, sucrose, sorbitol, xylitol, or a combination thereof.

17. The medium of clause 10, wherein the denaturant is SDS (sodium dodecyl sulfate), an ionic surfactant, or a non-ionic surfactant.

18. The medium of any of clauses 1 to 17, wherein the electrophoresis separation medium is selected from Table 1, 2A, 2B or 2C.

19. The medium of any of clauses 1 to 18, wherein the electrophoresis separation medium is selected from: 1.5-2.5% LPA 12.5% Xylitol 115 TES; 1.5-2.5% LPA 20% Xylitol 80 TES; 1.5-2.5% LPA 20% Xylitol 80 TES; 1.5-2.5% LPA 5% Xylitol 150 TES; 1.5-2.5% LPA 20% Xylitol 150 TES; 1.5-2.5% LPA 5% Xylitol 150 TES; 1.5-2.5% LPA 20% Xylitol 150 TES; 1.5-2.5% LPA 5% Xylitol 80 TES; 1.5-2.5% LPA 5% Xylitol 80 TES; 1.5-2.5% LPA 12.5% Sucrose 115 TES; 1.5-2.5% LPA 20% Sucrose 80 TES; 1.5-2.5% LPA 20% Sucrose 80 TES; 2.5% LPA 5% Sucrose 150 TES; 1.5-2.5% LPA 20% Sucrose 150 TES; 1.5-2.5% LPA 5% Sucrose 150 TES; 1.5-2.5% LPA 20% Sucrose 150 TES; 1.5-2.5% LPA 5% Sucrose 80 TES; 1.5-2.5% LPA 5% Sucrose 80 TES; 1.5-2.5% LPA 12.5% Galactose 115 TES; 1.5-2.5% LPA 20% Galactose 150 TES; 1.5-2.5% LPA 5% Galactose 150 TES; 1.5-2.5% LPA 5% Galactose 150 TES; 1.5-2.5% LPA 20% Galactose 150 TES; 1.5-2.5% LPA 20% Galactose 80 TES; 1.5-2.5% LPA 20% Galactose 80 TES; 1.5-2.5% LPA 5% Galactose 80 TES and 1.5-2.5% LPA 5% Galactose 80 TES.

20. The medium of any one of the preceding clauses, wherein the at least one polymer or copolymer is in an amount between about 1.0 wt % to about 8.0 wt % of the medium.

21. The medium of any one of the preceding clauses, wherein the medium includes one or more agents that is present in an amount between about 10 wt % and 50 wt % of the medium.

22. The medium of any one of the preceding clauses, further comprising SDS or other ionic or non-ionic surfactants.

23. The medium of any one of the preceding clauses, wherein the aqueous solvent comprises one or more pH-buffering salts.

24. The medium of clause 23, wherein the one or more pH-buffering salts is selected from the group consisting of Tris (Tris(hydroxymethyl) aminomethane), TAPS (3-{[1,3-dihydroxy-2-(hydroxymethyl) propan-2-yl] amino} propane-1-sulfonic acid), TES (2-{[1,3-dihydroxy-2-(hydroxymethyl) propan-2-yl] amino}ethanesulfonic acid), CHES (2-(Cyclohexyl amino) ethanesulfonic acid), EDTA (Ethylenediaminetetraacetic acid), TAPS/EDTA, TES/EDTA, Tris/TAPS/EDTA, Tris/TES/EDTA, Tris/acetate/EDTA, Tris/borate/EDTA, and Tris/CHES/EDTA.

25. The medium of any one of the preceding clauses, having a pH between about 6.0 and 9.0.

26. The medium of any one of the preceding clauses, comprising one or more water-miscible organic solvents.

27. The medium of clause 26, wherein the water-miscible organic solvent is acetonitrile, DMSO, or 2-pyrrolidinone.

28. The medium of any one of the preceding clauses, comprising a surface interaction component.

29. The medium of clause 28, wherein the surface interaction component is selected from pHEA, MCP-1 and a first and a second copolymerized monomers, the first monomer selected from a group consisting of acrylamide, methacrylamide, N-monosubstituted acrylamide, N-monosubstituted methacrylamide, N,N-disubstituted acrylamide, and N,N-disubstituted methacrylamide; and the second monomer selected from the group consisting of glycidyl group containing monomers, diol group containing monomers, and allyl group containing carbohydrate monomers.

30. The medium of any one of clauses 1-29, wherein the electrophoresis separation medium exhibits functional stability for capillary electrophoresis after storage at about 23° C. for: at least one month, at least two months, at least six months, at least one year, at least eighteen months, at least two years, greater than two years.

31. The medium of any one of the preceding clauses, wherein the electrophoresis separation medium exhibits functional stability for capillary electrophoresis after storage at about 23° C. for at least 30 days.

32. The medium of any one of the preceding clauses, wherein the electrophoresis separation medium exhibits functional stability for capillary electrophoresis after storage at between about 23° C. and about 40° C. for at least 14 days.

33. The medium of clause 1 or 2, wherein the electrophoresis separation medium includes less than about 5 wt % of urea.

34. A sieving polymer composition comprising:
(a) a sieving component comprising at least one polymer or copolymer;
(b) optionally, one or more agents, and
(c) an aqueous solvent or aqueous buffer;
wherein the sieving polymer composition exhibits functional stability for capillary electrophoresis after storage at a temperature of at least 23° C. for at least two weeks.

35. A sieving polymer composition comprising:
(a) a sieving component comprising at least one polymer or copolymer;
(b) optionally, one or more agents, and
(c) an aqueous solvent or aqueous buffer;
wherein the sieving polymer composition is substantially free of urea.

36. A sieving polymer composition comprising:
(a) a sieving component comprising at least one polymer or copolymer;
(b) optionally, one or more agents, and
(c) an aqueous solvent or aqueous buffer;
wherein the sieving polymer composition does not include urea.

37. The composition of any one of clauses 34 to 36, wherein the at least one polymer or copolymer is a non-crosslinked or sparsely cross-linked polymer or copolymer.

38. The composition of any one of clauses 34 to 36, wherein at least one polymer or copolymer is crosslinked.

39. The composition of any one of clauses 34 to 38, wherein the at least one polymer or copolymer is an uncharged water-soluble silica-adsorbing polymer or copolymer, a non-crosslinked acrylamide polymer or copolymer, a cellulose polymer or copolymer, a poly(alkylene oxide) polymer or copolymer, a polysaccharide, or a triblock copolymer.

40. The composition of any one of clauses 34 to 39, wherein the at least one polymer or copolymer is selected from the group consisting of linear polyacrylamide, polyethylene oxide, poly-N—N-dimethylacrylamide, polyvinylpyrrolidone, polyethylene glycol end capped with fluorocarbon tails, hydroxyethylcellulose, methylcellulose, hydroxypropylcellulose, hydroxypropylmethylcellulose, poly-N-acryloylaminopropanol, poly(N,N-dimethylacrylamide-co-N,N-dimethylacrylamide), poly(N-(acrylaminoethoxy)ethyl-1-D-glucopyranose), glucomannan, dextran, agarose, or poly-N-isopropylacrylamide.

41. The composition of any one of clauses 34 to 40, wherein the composition includes one or more agents that modifies the physical or sieving properties of the composition.

42. The composition of any one of clauses 34 to 41, wherein the composition includes one or more agents that is a denaturant, a compound capable of adjusting refractive index, or a compound capable of enhancing resolution.

43. The composition of any one of clauses 34 to 42, wherein the composition includes one or more agents that is a denaturant.

44. The composition of any one of clauses 34 to 43, wherein the composition includes one or more agents that is a compound capable of adjusting refractive index.

45. The composition of any one of clauses 34 to 44, wherein the composition includes one or more agents that is a compound capable of enhancing resolution.

46. The composition of any one of clauses 34 to 45, wherein the one or more agents is selected from the group consisting of proline, histidine, betaine, trehalose, acetonitrile, imidazole, DMSO, N-methyl-2-pyrrolidinone, 3-(1-pyridinio)-1-propanesulfonate, 2-N,N,N-tri-n-butylammonium acetate, 1,3-dimethylurea, 1,3-diethylurea, ethylurea, methylurea, 1,1-dimethylurea, and 1,1-diethylurea.

47. The composition of any one of clauses 34 to 46, wherein the composition includes one or more agents that is a saccharide or its derivatives, a sugar alcohol or polyol or its derivatives, a sugars or a sugar isomer or its derivatives, a pentose sugar, a hexose sugar, a starch, a carbohydrate a starch hydrolysate, a hydrogenated starch hysdrolysate, glucose or its derivatives, galactose or its derivatives, sucrose or its derivatives, fructose or its derivatives, lactose or its derivatives, erythrose or its derivatives, arabinose or its derivatives, maltose or its derivatives, mannose or its derivatives, rhamnose or its derivatives, xylose or its derivatives, trehalose or its derivatives, sucralose or its derivatives, cellubiose or its derivatives, xylitol or its derivatives, lactulose or its derivatives, sorbitol or its derivatives, mannitol or its derivatives, maltitol or its derivatives, lactitol or its derivatives, erythritol or its derivatives, glycerol or its derivatives, glycogen or its derivatives, low molecular weight dextran or its derivatives, or a combination thereof.

48. The composition of clause 47, wherein the saccharide is a monosaccharide, a disaccharide, a trisaccharide, an oligosaccharide, or a polysaccharide.

49. The composition of clause 47, wherein the composition includes one or more agents that is fructose, galactose, glucose, glycogen, trehalose, sucrose, sorbitol, xylitol, or a combination thereof.

50. The composition of any one of clauses 34 to 49, wherein the at least one polymer or copolymer is in an amount between about 1.0 wt % to about 8.0 wt % of the medium.

51. The composition of any one of clauses 34 to 50, wherein the composition includes one or more agents in an amount between about 10 wt % and 50 wt % of the medium.

52. The composition of any one of clauses 34 to 51, further comprising SDS or other ionic or non-ionic surfactants.

53. The composition of any one of clauses 34 to 52, wherein the aqueous solvent comprises one or more pH-buffering salts.

54. The composition of clause 53, wherein the one or more pH-buffering salts is selected from the group consisting of Tris (Tris(hydroxymethyl) aminomethane), TAPS (3-{[1,3-dihydroxy-2-(hydroxymethyl) propan-2-yl] amino} propane-1-sulfonic acid), TES (2-{[1,3-dihydroxy-2-(hydroxymethyl) propan-2-yl] amino}ethanesulfonic acid), CHES (2-(Cyclohexyl amino) ethanesulfonic acid), EDTA (Ethylenediaminetetraacetic acid), TAPS/EDTA, TES/EDTA, Tris/TAPS/EDTA, Tris/TES/EDTA, Tris/acetate/EDTA, Tris/borate/EDTA, and Tris/CHES/EDTA.

55. The composition of any one of clauses 34 to 54, having a pH between about 6.0 and 9.0.

56. The composition of any one of clauses 34 to 55, comprising one or more water-miscible organic solvents.

57. The composition of clause 56, wherein the water-miscible organic solvent is acetonitrile, DMSO, or 2-pyrrolidinone.

58. The composition of any one of clauses 34 to 57, comprising a surface interaction component.

59. The composition of clause 58, wherein the surface interaction component is selected from pHEA, MCP-1 and a first and a second copolymerized monomers, the first monomer selected from a group consisting of acrylamide, methacrylamide, N-monosubstituted acrylamide, N-monosubstituted methacrylamide, N,N-disubstituted acrylamide, and N,N-disubstituted methacrylamide; and the second monomer selected from the group consisting of glycidyl group containing monomers, diol group containing monomers, and allyl group containing carbohydrate monomers.

60. The composition of any one of clauses 34-59, wherein the composition exhibits functional stability for molecular sieving after storage at about 23° C. for: at least one month, at least two months, at least six months, at least one year, at least eighteen months, at least two years, greater than two years.

61. The composition of any one of clauses 34 to 59, wherein the composition exhibits functional stability for capillary electrophoresis after storage at between about 23° C. and about 40° C. for at least 14 days.

62. The composition of clause 34 or 35, wherein the composition includes less than about 5 wt % of urea.

63. A capillary electrophoresis element comprising,
  (a) an uncoated capillary; and
  (b) a composition for separating analytes located within the uncoated capillary, the composition comprising an electrophoresis separation medium or a sieving polymer composition according to any one of clauses 1 to 62.

64. The capillary element of clause 63, wherein the capillary comprises silica, fused silica, quartz, silicate-based glass, phosphate glass, alumina-containing glass.

65. The capillary element of clause 63, wherein the capillary is a plastic channel capillary.

66. A method for separating analytes, comprising: separating the analytes using an electrophoresis separation medium or a sieving polymer composition according to any one of clauses 1 to 62.

67. The method for separating analytes of clause 66, wherein said analytes are selected from DNA, peptides, proteins, nucleic acids, glycoproteins and glycans.

68. The method for separating analytes of clause 66, wherein said DNA, peptides, proteins, glycoproteins or glycans are separated based on size, or are identified based on size.

69. The method for separating analytes according to any one of clauses 66-68, wherein said peptides, proteins, glycoproteins or glycans are separated under denaturing conditions without urea, 70. The method for separating analytes according to any one of clauses 66-68, wherein said peptides, proteins, glycoproteins or glycans are separated under native conditions without urea, 71. The method for separating analytes according to any one of clauses 66-68, wherein said DNA, peptides, proteins, glycoproteins or glycans are identified using peaks on an electropherogram.

72. The method for separating analytes of clause 71, wherein said identification may be manual, or use suitable software for detection of peaks.

73. The method for separating analytes according to any one of clauses 66-71, which is carried out in parallel with a plurality of uncoated capillaries.

74. A method for separating analytes comprising: separating the analytes by capillary electrophoresis with using at least one capillary electrophoresis element of Clause 63.

75. A method for separating analytes according to any of clauses 66-72, further comprising applying an electric current to the separation medium or the sieving polymer composition, and migrating the analytes through the separatiom medium or the sieving polymer composition.

76. A method for separating analytes according to clause 66, further including separating the analytes based on size, electrical charge, tertiary structure or ligand binding.

77. A method for separating analytes according to clause 66, further including identifying the analyte based on rate of migration or position in the separation medium or in the sieving polymer composition.

78. A method for separating analytes according to any of clauses 66-77, wherein the analyte is a nucleic acid, a protein, a peptide, a glycoprotein, a glycan, a monosaccharide or a polysaccharide.

79. A method for separating analytes according to any of clauses 66-77, wherein the analyte is a nucleic acid that is an amplification product of an oligonucleotide, a polynucleotide, a single-stranded DNA, a double-stranded DNA, an RNA, or a cDNA, and the method further includes generating the amplification product via nucleic acid amplification prior to the separating.

80. A method for separating analytes according to any of clauses 66-79, wherein the analyte is a nucleic acid that includes a short tandem repeat (STR).

81. An electrophoresis separation medium comprising:
  (a) a non-crosslinked or sparsely cross-linked polymer or copolymer;
  (b) one or more denaturant compounds, in an amount sufficient to inhibit re-naturation of single stranded polynucleotides;
  (c) an aqueous solvent;
  (d) optionally, a wall-coating material suited to inhibition of electroosmotic flow; and
  (e) optionally, an organic water miscible solvent such as DMSO or acetonitrile,
wherein the electrophoresis separation medium exhibits functional stability for at least seven days at 23° C.

82. The medium of clause 81, wherein the polymer or co-polymer comprises a mono-N-substituted acrylamide monomer or a di-N-substituted acrylamide monomer.

83. The medium of clause 81, wherein the polymer or co-polymer comprises one or more acrylamide monomers selected from dimethylacrylamide, diethylacrylamide, N-acryloyl-aminoethoxyethanol-substituted acrylamide (NAEE) monomer and N-allyl glucose monomer (NAGL).

84. The medium of clause 81, wherein the polymer or co-polymer comprises a polyvinylpyrrolidone.

85. The medium of clause 81, wherein the polymer or co-polymer comprises hydroxyethylcellulose.

86. The medium of clause 81, wherein the denaturant is selected from the group consisting of proline, histidine, betaine, trehalose, acetonitrile, imidazole, DMSO, N-methyl-2-pyrrolidinone, 3-(1-pyridinio)-1-propanesulfonate, and 2-N,N,N-Tri-n-butylammonium acetate.

87. The medium of clause 81, wherein the polymers have a weight-average molar mass of at least 500,000 g/mol, e.g., between 3.5M g/mol and 5M g/mol.

88. The medium of clause 81, comprising polymers in an amount between about 1.5% (w/v) and 8.0% (w/v), e.g., about 5.5% (w/v).

89. The medium of clause 81, wherein the polymer or co-polymer is a linear polymer.

90. The medium of clause 81, which comprises a sparsely cross-linked polymer comprising 1×1 o-s mol % to about 1×10-3 mol % cross-linking moiety.

91. The medium of clause 81, polymerized from a mixture containing less than about
0.1% (w/v) of a cross-linking moiety in the polymerization mixture.

92. The medium of clause 81, wherein the polymer is a homo-polymer or co-polymer of one or more N-substituted acrylamide monomers selected from dimethylacrylamide, diethylacrylamide, N-acryloyl-aminoethoxyethanol-substituted acrylamide (NAEE) monomer and N-allyl glucose ("NAG") monomer.

93. The medium of clause 92, wherein the polymer comprises at least any of 80%, 85%, 90% 95%, 97% or 99% w/w dimethylacrylamide monomer.

94. The medium of clause 93, wherein the polymer further comprises between about 1% and 20% w/w diethylacrylamide monomers.

95. The medium of clause 93, wherein the polymer further comprises between about 1% and about 10% w/w N-acryloyl-aminoethoxyethanol-substituted acrylamide (NAEE) monomer or N-allyl glucose monomer (e.g., about 3% w/w).

96. The medium of clause 93, comprising between about 1% and about 10% w/w diethylacrylamide monomers.

97. The medium of clause 81, wherein the polymer is a co-polymer comprising at least one acrylamide monomer other than dimethylacrylamide, diethylacrylamide, N-acryloyl-aminoethoxyethanol-substituted acrylamide (NAEE) monomer and N-allyl glucose monomer.

98. The medium of clause 81, comprising a polymer blend.

99. The medium of clause 98, wherein all the polymers in the blend are polymers selected from dimethylacrylamide, diethylacrylamide, N-acryloyl-aminoethoxyethanol. substituted acrylamide (NAEE) monomer and N-allyl glucose ("NAG") monomer.

100. The medium of clause 81, comprising a plurality of denaturant compounds selected from the group consisting of praline, histidine, betaine, trehalose, acetonitrile, imidazole, DMSO, N-methyl-2-pyrrolidinone, 3-(1-pyridinio)-1-propanesulfonate, and 2-N,N,N-Tri-n-butylammonium acetate.

101. The medium of clause 81, comprising the denaturant compound in an amount between about 0.2 M to 5.5 M, e.g., about 2M.

102. The medium of clause 81, further comprising SDS or other ionic or non-ionic surfactants.

103. The medium of clause 81, wherein the aqueous solvent comprises one or more pH-buffering salts.

104. The medium of clause 103, wherein the buffering salts is selected from Tris (Tris(hydroxymethyl) aminomethane), TAPS (3-{[1,3-dihydroxy-2-(hydroxymethyl) propan-2-yl] amino} propane-1-sulfonic acid), TES (2-{[1, 3-dihydroxy-2-(hydroxymethyl) propan-2-yl] amino}ethanesulfonic acid), CHES (2-(Cyclohexyl amino) ethanesulfonic acid), EDTA (Ethylenediaminetetraacetic acid), TAPS/EDTA, TES/EDTA, Tris/TAPS/EDTA, Tris/TES/EDTA, Tris/acetate/EDTA, Tris/borate/EDTA, and Tris/CHES/EDTA.

105. The medium of clause 81, having a pH between about 6.0 and 9.0.

106. The medium of clause 81, further comprising acetonitrile, e.g., at 4%-7% (v/v).

107. The medium of clause 81, further comprising DMSO, e.g., at 0.3-5.0% (v/v).

108. The medium of clause 81, comprising a capillary wall-coating material.

109. The medium of clause 108, wherein the wall-coating material is selected from pHEA, MCP-1 and a first and a second copolymerized monomers, said first monomer selected from a group consisting of acrylamide, methacrylamide, N-monosubstituted acrylamide, N-monosubstituted methacrylamide, N, N-disubstituted acrylamide, and N,N-disubstituted methacrylamide; and said second monomer selected from the group consisting of glycidyl group containing monomers, dial group containing monomers and allyl group containing carbohydrate monomers.

110. The medium of clause 81, which exhibits functional stability for capillary electrophoresis after storage at about room temperature for: at least one month, at least two months, at least six months, at least one year, at least eighteen months, at least two years, greater than two years.

111. The medium of clause 81, which, after storage at room temperature for at least any of one day, one week, one month or six months, has no more than 2% of the polymers exhibiting carboxylic acid side chain moieties, e.g., resulting from hydrolysis.

112. The medium of clause 81, which is free, essentially free or substantially free of biomolecules (e.g., nucleic acids, DNA, RNA or polypeptides).

113. The medium of clause 81, free, essentially free or substantially free of urea, N-methyl-2-pyrrolidinone, o-caprolactam, N-methyl-caprolactam, guanidinium hydrochloride, dimethylformamide (DMF), and/or dimethylsulfoxide (DMSO).

114. A device comprising a solid substrate having microchannel filled with a medium of clause 81.

115. The device of clause 114 wherein the substrate is an electrophoresis capillary.

116. The device of clause 114 wherein the substrate comprises a wall coated with a dynamically adsorbed coating or a covalently attached coating.

117. The device of clause 114 further comprising electrodes in electrical communication with the medium.

118. A device comprising a syringe comprising a barrel comprising an internal space and a plunger fitted in the space, wherein the space contains a medium of clause 65.

119. The device of clause 118 wherein the plunger further comprises an anode or cathode that communicates with the internal space.

120. A kit comprising: a container containing a medium of any of clauses 1-33 or a composition of any of clause 34-62, and a container containing an electrophoresis buffer.

121. The kit of clause 120 further comprising reagents for protein and/or glycan analysis.

122. The kit of clause 120 or 121 further comprising a protein labeling dye, a glycan cleaving enzyme, buffers, and an instruction manual for protein labeling and purification, for glycan labeling and purification.

123. The kit of clauses 120 to 122, wherein the electrophoretic medium in the kit can be stored at room temperature and exhibits functional stability for capillary electrophoresis for: at least one month, at least two months, at least six months, at least one year, at least eighteen months, at least two years, greater than two years.

124. A system comprising a sample preparation module configured to perform DNA amplification or cycle sequencing; and a detection module comprising a solid substrate having microchannel filled with a medium of clause 81.

125. A system comprising a sample preparation module configured to perform protein separation and analysis, wherein the module includes a medium of any of clauses 1-33 or a composition of any of clause 34-62.

126. A system comprising a sample preparation module configured to perform glycan separation and analysis, wherein the module includes a medium of any of clauses 1-33 or a composition of any of clause 34-62.

127. A method comprising performing electrophoretic separation on a biomolecular analyte using a separation medium of clause 81.

128. The method of clause 127 further comprising, before electrophoresis, storing the separation medium for at least any of one day, one week, one month, six months, one year, eighteen months, two year at a temperature between at least 15° C. and 40° C.

129. The method of clause 127 performed in a point-of-care setting, a police booking station or a combat zone.

130. The method of clause 127 comprising storing the medium at a temperature of at least any of 20° C., 25° C. or 30° C.

131. The method of clause 127 wherein the analyte comprises a nucleic acid (e.g., DNA or RNA), a protein or a complex thereof.

132. The method of clause 127 wherein the analyte comprises DNA polynucleotides having an average size no more than about 1300 nucleotides.

133. The method of clause 127 wherein the analyte comprises DNA amplified from one or more STR loci, e.g., a forensic locus.

134. The method of clause 127 wherein the analyte comprises a DNA ladder.

135. The method of clause 127 comprising injecting the medium into a microchannel of a microfluidic device or an electrophoresis capillary.

136. The method of clause 127 wherein the medium is stored in a microchannel of a microfluidic device or an electrophoresis capillary.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 1 shows exemplary N,N-substituted acrylamide monomers useful in polymers or copolymers of this disclosure.

FIG. 2 shows polyvinylpyrrolidone and hydroxyethylcellulose.

FIG. 3 shows exemplary compounds useful for maintaining a denatured state of nucleic acids during electrophoresis.

FIG. 6a shows the spatial calibration for with this polymer with urea, indicating that there were uniform signals throughout all the capillaries. FIG. 6b electropherogram shows that, due to the presence of urea, the protein fragments did not resolve distinctly, indicating that urea destroys protein resolution. Electrophoresis run conditions were 18 kV, 1 second data delay and 4000 second run time.

FIG. 6c shows the spatial calibration for with the 2% LPA only polymer indicating that the signals were not uniform throughout all the capillaries, due to the absence of urea. FIG. 6d electropherogram shows that, due to the absence of urea, sharp peaks of all 7 proteins were well resolved. The run conditions were 18 kV, 1 second data delay and 4000 second run time.

FIG. 7a shows spatial calibration of the polymer with sugar showing uniform signals throughout all the capillaries. FIG. 7b electropherogram shows that the protein standards were well resolved. This formulation showed excellent peak separation, uniform peak shapes and baseline resolution. Electrophoresis was run at 25° C., 18 kV, 1 second data delay and 3000 second run time.

FIG. 8a shows the spatial calibration of the polymer with sugar showing uniform signals throughout all the capillaries. FIG. 8b electropherogram shows that the protein standards were well resolved. This formulation showed excellent peak separation, uniform peak shapes and baseline resolution. Electrophoresis was run at 40° C., 8 kV, 1 second data delay and 4000 second run time.

FIG. 9a shows the spatial calibration of the polymer with sugar showing uniform signals throughout all the capillaries. FIG. 9b electropherogram shows that 2% LPA with 30% Sucrose was able to resolve all proteins well. Electrophoresis was run was at 40° C., 18 kV, 250 second data delay and 3000 second run time.

FIG. 12A-C shows reproducibility of resolution plots from capillary electrophoresis after aging a urea-free formulation of the disclosure prepared with 3.75% polydimethylacrylamide and 1.75M 1,3-dimethylurea. Resolution is displayed for the initial resolution before aging (FIG. 12A), after aging at 37° C. for 27 days (FIG. 12B), and after aging at 37° C. for 56 days (FIG. 12C). Applied Biosystems GeneScan™ 1200 LIZ™ dye Size Standard dye-labeled, single-stranded DNA fragments were used for the testing. Testing was carried out using an Applied Biosystems 3500 Genetic Analyzer using standard conditions.

FIGS. 16A and 16B show the analysis of dsDNA by capillary electrophoresis using a standard urea-containing formulation (FIG. 16A), and a urea-free formulation of the disclosure (FIG. 16B). Expanded view from 39 bp to 200 bp of TAMRA labeled GS500 Size Standard.

FIGS. 17A and 17B show the analysis of dsDNA by capillary electrophoresis using a standard urea-containing formulation (FIG. 17A), and a urea-free formulation of the disclosure (FIG. 17B). Expanded view from 300 bp to 500 bp of TAMRA labeled GS500 Size Standard. In (FIG. 17A) using the urea containing polymer (POP7) the 340/350 bp fragments are not resolved and peaks show peak broadening as result of the presence of urea. In (FIG. 17B) using the urea-free formulation, the 340/350 bp fragments are resolved.

FIGS. 18A-18D show 4 STR markers as indicated in panels 18A, 18A-1, 18B, 18B-1, 18C, and 18C-1, and the size standard Liz1200 (18D and 18D-1) containing fragments ranging in size from 20 to 1,200 bases. The alleles circled in 18A, 18A-1, 18B, 18B-1, 18C, and 18C-1 are separated by 1 bp. DNA samples were analyzed in the polymer at Time=0 (A), or after being stored at 37° C. for 8 weeks (B).

FIG. 20B: 2.2% LPA containing polymer with or without sucrose). The circled peak(s) indicate the alleles 9.1/10 of the THO1 STR marker that differ in size by 1 base.

DETAILED DESCRIPTION

Figure 4:
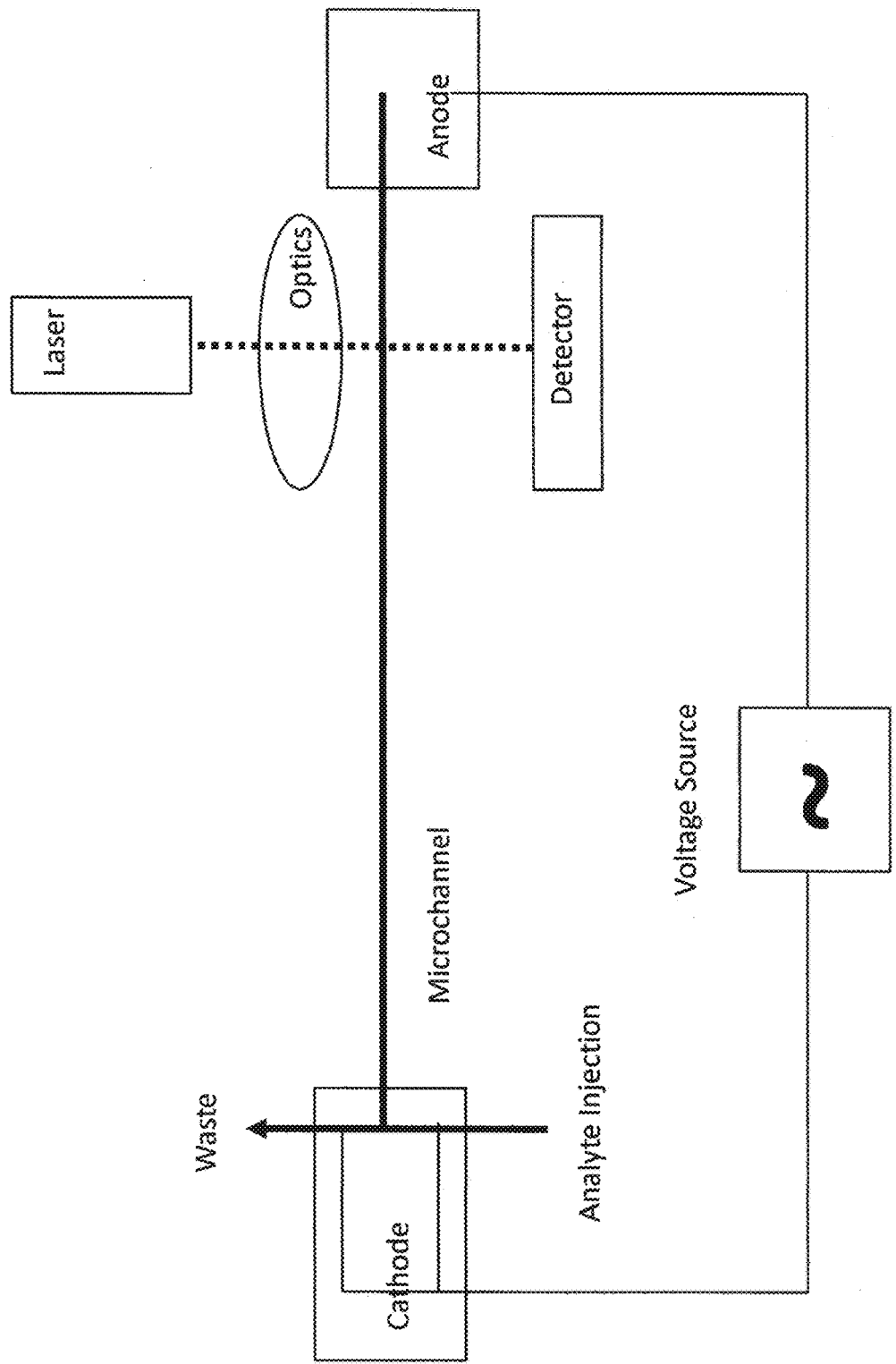
FIG. 4 shows an exemplary electrophoresis assembly.

This disclosure provides, among other things, an electrophoresis separation medium. The medium is particularly useful for separation of single-stranded DNA, and exhibits a shelf life, particularly at room temperature, that is significantly longer than media containing urea as a denaturant. Also provided are devices, kits, systems and methods using the disclosed electrophoresis separation medium.

In some embodiments, this disclosure provides, among other things, a polymer sieving composition. The composition is useful for molecular sieving. In some embodiments, the composition is useful for separation of molecules, including but not limited to biomolecules such as nucleic acids, proteins, glycoproteins and glycans. The composition is optionally useful for size-based separation of biomolecules, either under denaturing conditions or under non-denaturing conditions. The composition can exhibit a shelf life, particularly at room temperature, that is significantly longer than conventional sieving compositions containing urea as a denaturant. Also provided are devices, kits, systems and methods using the disclosed sieving compositions.

I. Electrophoresis Separation Medium

In one aspect, this disclosure provides an electrophoresis separation medium comprising: (a) a non-crosslinked or sparsely cross-linked polymer or copolymer; (b) one or more denaturant compounds, in an amount sufficient to inhibit re-naturation of single stranded polynucleotides; (c) an aqueous solvent; (d) optionally, a wall-coating material suited to inhibition of electroosmotic flow; and (e) optionally, an organic water miscible solvent such as DMSO or acetonitrile, wherein the electrophoresis separation medium exhibits functional stability for at least seven days at 23° C.

In another aspect, and in some embodiments, this disclosure provides a sieving polymer composition, such as an electrophoresis separation medium comprising: (a) a sieving component comprising at least one polymer or copolymer; (b) one or more of a denaturant, a renaturation inhibitor, or a resolution enhancer, (c) an aqueous solvent or aqueous buffer; (d) optionally, a surface interaction component having a different polymer chemical composition from the sieving component; and (e) optionally, a water-miscible organic solvent; wherein the electrophoresis separation medium is substantially free of urea.

In another aspect, this disclosure provides an electrophoresis separation medium comprising: (a) a sieving component comprising at least one polymer or copolymer; (b) one or more of a denaturant, a renaturation inhibitor, or a resolution enhancer, (c) an aqueous solvent or aqueous buffer; (d) optionally, a surface interaction component having a different polymer chemical composition from the sieving component; and (e) optionally, a water-miscible organic solvent; wherein the electrophoresis separation medium does not contain urea.

A. Polymers

As used herein "polymer" refers to homopolymers (formed by polymerization of a single monomer species) and co-polymers (formed by polymerization of a plurality of different monomer species), including linear polymers and cross-linked polymers. In some embodiments, the polymer or copolymer can be a non-crosslinked or sparsely cross-linked polymer or copolymer. In some embodiments, the polymer or copolymer can be crosslinked. In some embodiments, the polymer or copolymer can be a linear polymer or copolymer.

Any polymer exhibiting functional stability for electrophoresis can be used in the compositions and methods described herein. These include, without limitation, various N-substituted polyacrylamides, polyvinylpyrrolidones and hydroxyethyl cellulose. In some embodiments, the polymer or copolymer can be an uncharged water-soluble silica-adsorbing polymer or copolymer, a non-crosslinked acrylamide polymer or copolymer, a cellulose polymer or copolymer, a poly(alkylene oxide) polymer or copolymer, a polysaccharide, or a triblock copolymer.

In some embodiments, uncharged water-soluble silica-adsorbing polymers provide for suppressing electroendosmotic flow. In one embodiment, polymers are selected from the group consisting of polyvinylactams, such as polyvinylpyrrolidone; N,N-disubstituted polyacrylamides; and N-substituted polyacrylamides. In another embodiment polymers are poly(N,N-dimethylacrylamide). Such polymers are described in U.S. Pat. No. 5,552,028, the disclosure of which is hereby incorporated by reference in its entirety.

Polyvinylpyrrolidone can be included in the polymer mix in a range 250,000 g/mol to 1.5M g/mol, or a higher average molecular weight that can be obtained. Generally, higher average molecular weights are more useful for DNA sieving.

Hydroxyethyl cellulose (HEC) also can be used as the polymer. High-MW HECs are commercially available, pharmaceutical grade (i.e., in high purity, as is preferred for this use) from Hercules, Inc. (Warrington, Pa.) or Aqualon Company, Wilmington, Del. Useful average molecular weights can be between 100,000 g/mol and 2 million g/mol.

Certain "N-substituted" acrylamide polymers (with chemical substituents pendant to the side-chain nitrogen group; such as poly-N,N-dimethylacrylamide) are relatively stable to spontaneous hydrolysis, as compared with unsubstituted acrylamide polymers, even at higher pH values such as pH 8, and can be used in the CE applications discussed herein. The polymers of the media provided herein are preferably polymers of any N- or N,N-substituted acrylamide monomers that produce a chemically stable polymer. This includes, without limitation, homopolymers or co-polymers of alkyl, allyl or acryloyl polymerizable monomers. N-alkyl acrylamide substituted monomers of interest include, without limitation, dimethylacrylamide ("DMA") and diethylacrylamide ("DEA"). Acryloyl acrylamide substituted monomers include, without limitation, N-acryloyl-aminoethoxyethanol acrylamide ("NAEE"). Allyl-substituted acrylamide monomers include, without limitation, N-allyl glucose ("NAGL") monomers. The NAEE and NAGL monomers are more hydrophilic than DMA, DEA, or other alkyl acrylamides, while still being very stable to hydrolysis, and are useful to increase the water-solubility and increase the DNA sieving capabilities of co-polymers. In some embodiments, the useful percentages of DEA or N-alkylacrylamide monomers will be less than 20% on a molar basis in the co-polymers, in a polymer substantially based on a plurality of DMA monomers; or, for the more hydrophilic monomers NAEE or NAGL, less than 10% on a molar basis.

In further embodiments, polymers may comprise an N-vinyl amide-type monomer. Such polymers are described in U.S. Pat. No. 9,671,367, the disclosure of which is incorporated by reference in its entirety. In some embodiments, the N-vinyl amide-type polymer can be Poly(N-vinyl acetamide) (PNVA).

In some embodiments, polymer or copolymer is selected from the group consisting of linear polyacrylamide, polyethylene oxide, poly-N—N-dimethylacrylamide, polyvinylpyrrolidone, polyethylene glycol end capped with fluorocarbon tails, hydroxyethylcellulose, methylcellulose, hydroxypropyl cellulose, hydroxypropyl methyl cellulose, poly-N-acryloyl aminopropanol, poly(N,N-dimethylacrylamide-co-N,N-dimethylacrylamide), poly(N-(acryl aminoethoxy)ethyl-β-D-glucopyranose), glucomannan, dextran, agarose, or poly-N-isopropyl acrylamide.

Typically, co-polymers will be random co-polymers, that is, formed from the polymerization of a mixture of different monomers which will be randomly incorporated, in no particular order, into growing polymer chains. However, in some embodiments, co-polymers can be "block" co-polymers, that is, co-polymers which as polymerized contain small groups of certain monomers incorporated into "blocks" of a certain type of monomers.

N-substituted polyacrylamides of the composition can have a weight-average molar mass of at least 500,000 g/mol and generally significantly higher in molar mass, e.g., between 3.5 M g/mol and 5M g/mol. They can be present in the composition in an amount between about 1.5% (w/v) and 8.0% (w/v), e.g., about 5.5% (w/v) copolymer dissolved in the electrophoresis medium.

Polymers suitable for the compositions disclosed may be obtained from commercial sources and include but are not limited to NANOPOP-4, NANOPOP-6 and NANOPOP-7 polymers from MCLAB and POP-4, POP-6 and POP-7 polymers from Thermo Fisher Scientific.

The composition can comprise linear polymers and/or cross-linked polymers. For instance, a sparsely cross-linked polymer can comprise $1\times10^{-8}$ mol % to about $1\times10^{-3}$ mol % of cross-linking moiety, such as bis-acrylamide. Alternatively, a cross-linked polymer can be polymerized from a solution containing less than about 0.1% (w/v) of a cross-linking moiety in the polymerization mixture.

In some embodiments, the medium is used in the performance of electrophoresis in a microchannel. In certain embodiments, the microchannel has at least one aspect no greater than 120 microns. Channels can be cylindrical in geometry, such as in a glass or fused silica capillary, or rectangular in shape, such as in a glass, plastic, or hybrid glass/plastic layered microfluidic device. In the case of capillary electrophoresis, a preferred microchannel dimension for a cylindrical channel is an inner diameter of about 75 microns. In microchannel-based electrophoresis devices, linear polymers or sparsely cross-linked polymers are preferred, because they produce a substantially fluid electrophoresis medium that can be pumped into and out of the microchannel under moderate applied positive or negative pressures, to force a spent aliquot of medium out of the microchannel, and refill the microchannel with a fresh aliquot of separation medium.

In some embodiments, the polymer is a homo-polymer or co-polymers of one or more N-substituted acrylamide monomers selected from the group consisting of DMA, DEA, NAEE and NAGL, that is, it contains only monomers selected from the group. One exemplary polymer comprises at least any of 80%, 85%, 90%, 95%, 97% or 99% (w/w) dimethylacrylamide monomer. Another polymer further comprises between about 1% and about 20% diethylacrylamide monomers. Another polymer further comprises between about 1% and about 10% w/w of a more hydrophilic monomer, e.g., N-acryloyl-aminoethoxyethanol-substituted acrylamide (NAEE) monomers, or N-allyl glucose monomers (e.g., about 3% w/w).

In other embodiments, compositions are provided that comprise a sieving component, comprising at least one low viscosity, high molecular weight non-crosslinked acrylamide polymer, and a surface interaction component, comprising at least one non-crosslinked polymer. Such polymers are described in U.S. Pat. Nos. 8,221,607, 8,366,900, 8,734,630, 9,625,416 and 9,964,517, the disclosures of which are hereby incorporated by reference in their entirety.

In another embodiment the polymer is a co-polymer comprising DMA and at least one acrylamide monomer not selected from the group consisting of DEA, NAEE and NAGL.

In another embodiment the composition comprises a polymer blend. "Blend" means a mixture of two or more polymers that may differ in physical or chemical polymer properties, or both. The blend can include only polymers comprising DMA or co-polymers comprising DMA and any of DEA, NAEE or NAGL, as well as these polymers and others (e.g., co-polymers comprising DMA and at least one other monomer other than DEA, NAEE and NAGL, or acrylamide polymers not including DMA.

In some embodiments, the polymer or copolymer can be used in the electrophoresis separation media or sieving polymer compositions described herein in an amount between about 1.0 wt % to about 8.0 wt % of the medium. In some embodiments, the polymer or copolymer can be used in the electrophoresis separation media or sieving polymer compositions described herein in an amount between 1.0 wt % to 8.0 wt % of the medium or composition. In some embodiments, the polymer or copolymer can be used in the electrophoresis separation media or sieving polymer compositions described herein in an amount between about 2.0 wt % to about 7.0 wt % of the medium or composition. In some embodiments, the polymer or copolymer can be used in the electrophoresis separation media or sieving polymer compositions described herein in an amount between 2.0 wt % to 7.0 wt % of the medium or composition. In some embodiments, the polymer or copolymer can be used in the electrophoresis separation media or sieving polymer compositions described herein in an amount between about 3.0 wt % to about 6.0 wt % of the medium or composition. In some embodiments, the polymer or copolymer can be used in the electrophoresis separation media or sieving polymer compositions described herein in an amount between 3.0 wt % to 3.0 wt % of the medium or composition.

B. Nucleic Acid Applications

Sieving compositions and capillary electrophoresis (CE) compositions and associated instruments are useful for analysis of nucleic acid samples, and are employed for, among other things, nucleic acid sequencing, genotyping, and forensic genetic analyses. In some embodiments, the analysis of a nucleic acid sample using such instruments can involve the preparation of single-stranded DNA (ssDNA) by sequencing, PCR, or denaturation of double stranded DNA (dsDNA). In some methods, it is necessary to denature dsDNA to provide ssDNA. In many CE applications known in the art, urea is used as a denaturant. However, as noted above, the use of urea as a denaturant in a capillary electrophoresis medium leads to certain limitations. Accordingly, in some embodiments, the present disclosure provides for capillary electrophoresis media that contain a denaturant that is not urea. In some embodiments, the present disclosure provides for capillary electrophoresis media that is substantially free of urea.

1. Denaturant Compounds

Compositions of this disclosure include one or more compounds that can cause denaturation of dsDNA or inhibit re-naturation of single-stranded polynucleotides during electrophoresis (as used herein, "denaturant compounds"). For electrophoresis in ssDNA applications, the DNA should be completely or essentially single-stranded. Typically double-stranded DNA is denatured prior to electrophoresis with high temperature, so that single-stranded polynucleotides can be analyzed. Urea has been used to maintain DNA single-strandedness in capillary electrophoresis. However, urea is known to degrade quickly and separation media containing it typically cannot be used more than about a day after formulation, unless refrigerated at 4° C. In contrast, the denaturant compounds used in the compositions of this disclosure resist such rapid degradation. Accordingly, the compositions can include one or more (e.g., a plurality of) compounds selected from proline (e.g., L-proline, D-proline or a racemic mixture thereof), histidine (e.g., L-histidine, D-histidine or a racemic mixture thereof), betaine, trehalose, acetonitrile, imidazole, dimethyl sulfoxide (DMSO), N-methyl-2-pyrrolidinone, 3-(1-pyridinio)-1-propanesulfonate and 2-N,N,N-Tri-n-butylammonium acetate. In some embodiments, the compositions described herein can include one or more compounds of the formula (I)

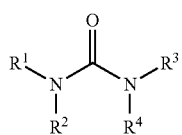

(I)

wherein $R^1$, $R^2$, $R^3$, and $R^4$ are each independently H or optionally substituted $C_1$-$C_6$ alkyl, with the proviso that at least one of $R^1$, $R^2$, $R^3$, and $R^4$ is not H. In some embodiments, the compositions described herein do not include urea ($H_2NC(O)NH_2$). In some embodiments, the denaturant can be any compound described by the formula (I), including but not limited to, 1,3-dimethylurea, 1,1-dimethylurea, 1,3-diethylurea, 1,1-diethylurea, ethylurea, propyl urea, and the like.

The compounds can be present in an amount sufficient to denature double-stranded DNA or other nucleic acid, including derivatives or analogs of DNA. However, more typically, the compounds will be present in an amount sufficient to inhibit re-formation of double-stranded (comprising two strands) DNA molecules during the electrophoretic analysis, for example, from polynucleotides that are already heat-denatured. In certain embodiments, the denaturant comprises a mixture of two, three, four or more than four of the aforementioned denaturants. In some embodiments, the compound can be present in the separation medium in an amount between about 0.2 M to 5.5 M, e.g., about 2M. In some embodiments, the concentration of the denaturant compound in the medium or composition can be from between about 1 M to about 4 M. In some embodiments, the concentration of the denaturant compound in the medium or composition can be from between about 1.25 M to about 3 M. In some embodiments, the concentration of the denaturant compound in the medium or composition can be from between about 1.5 M to about 2.5 M. In some embodiments, the denaturant compound can be in an amount between about 10 wt % and 50 wt % of the medium or composition. In some embodiments, the denaturant compound can be in an amount between about 20 wt % and 40 wt % of the medium or composition. In some embodiments, the concentration of the denaturant compound in the medium or composition can be from between 1 M to 4 M. In some embodiments, the concentration of the denaturant compound in the medium or composition can be from between 1.25 M to 3 M. In some embodiments, the concentration of the denaturant compound in the medium or composition can be from between 1.5 M to 2.5 M. In some embodiments, the denaturant compound can be in an amount between 10 wt % and 50 wt % of the medium or composition. In some embodiments, the denaturant compound can be in an amount between about 20 wt % and 40 wt % of the medium or composition.

In exemplary embodiments the denaturant can be (a) about 2M proline and trehalose (e.g., in about a 1:1 mixture); (b) betaine and proline (e.g., about 2M, or in about a 1:1 mixture); (c) betaine, trehalose and proline (e.g., about 3M or in about a 1:1 mixture); (d) acetonitrile (e.g., about 6% v/v); (e) acetonitrile and 2M 2-N,N,N-Tri-n-butylammonium acetate (e.g., about 3% acetonitrile and about 2M 2-N,N,N-Tri-n-butylammonium acetate); (f) proline and DMSO (e.g., about 2M Proline and 1.3% DMSO); (g) betaine and DMSO (e.g., about 2M Betaine and 1.3% DMSO). DMSO, which is miscible with aqueous media and a stable molecule, has higher viscosity than water. It can be used in amounts that do not interfere with CE. The addition of small amounts of water-miscible organic solvents such as DMSO or acetonitrile can improve the separation medium by enhancing the solubility of the non-urea denaturants or of the sieving polymer or copolymers. Compositions of this disclosure can be free, "essentially free" (i.e., in no more than trace amounts) or substantially free of biomolecules (e.g., nucleic acids, DNA, RNA or polypeptides) and/or of urea, N-methyl-2-pyrrolidinone, 6-caprolactam, N-methylcaprolactam, guanidinium hydrochloride, dimethylformamide (DMF) or dimethyl sulfoxide (DMSO). "Essentially free" can mean amounts carried over during sample preparation, e.g., by PCR. As used herein, "substantially free" means amounts that still allow the separation medium to retain functional stability. For example, "substantially free" can include up to about 5 wt % of the component, such as urea, or up to about 4 wt %, or up to about 3 wt %, or up to about 2 wt %, or up to about 1 wt %, or up to about 0.5 wt %. In further embodiments, "substantially free" can include up to 5 wt % of the component, such as urea, or up to 4 wt %, or up to 3 wt %, or up to 2 wt %, or up to 1 wt %, or up to 0.5 wt %.

C. Double Stranded DNA Applications

Capillary electrophoresis (CE) instruments are useful for analysis of DNA samples, and are employed for applications that involve dsDNA, for example analysis of RNA and DNA labeled with an intercalating dye. In some embodiments, PCR fragments labeled with an intercalating dye can be analyzed using the compositions and methods described herein. In some embodiments, DNA libraries labeled with an intercalating dye can be analyzed using the compositions and methods described herein. In some embodiments, the systems and methods described herein can use multiple fluorescent dyes within the same capillary. In some embodiments, dsDNA labeled with an intercalating dye can be sized with a single-stranded size standard that is labeled with a different dye.

D. Protein Applications

Sieving compositions and capillary electrophoresis (CE) compositions and associated instruments are also useful for the analysis of proteins, peptides, glycoproteins and glycans samples. The compositions can be employed for, among other things, protein or peptide sequencing, glycan analysis and/or glycan sequencing, or for recombinant protein analyses, antibody analyses or biosimilar analyses. In many CE applications known in the art, urea is used as a denaturant. However, as noted above, the use of urea as a denaturant in a capillary electrophoresis medium for proteins, peptides, glycoproteins or glycans can lead to certain limitations like poor separation. Accordingly, in some embodiments, the present disclosure provides for capillary electrophoresis media that contain a denaturant that is not urea, such as SDS or any related detergent. In some embodiments, the present disclosure provides that is free of urea. In some embodiments the methods for analyzing proteins, glycoproteins, peptides or glycans are urea free for capillary electrophoresis media. Further to this embodiment, in such capillary electrophoresis (CE) urea-free analysis, it may be necessary to denature the protein, glycoprotein or peptide during electrophoresis with common denaturants like SDS or related detergents. In other methods, it may be necessary to analyze the protein glycoprotein or peptide in its native state without a detergent like SDS or the like. Therefore, in certain embodiments, provided herein are electrophoretic separation media, sieving compositions, including polymer-based sieving compositions, free of urea but instead comprises sugars to improve resolution. Exemplary compositions for capillary electrophoresis are described the Examples in Tables 1, 2A, 2B and 2C, also referred to as electrophoresis separation medium. The compositions were used for the separation and/or resolution of biomolecules such as DNA, proteins, peptides, glycoproteins, glycans.

E. Compounds capable of adjusting refractive index and Resolution Enhancers

Urea is known in the art to for assisting in matching the refractive index of the separation media to that of the fused-silica material that makes up the walls of capillaries in CE systems. Urea at concentrations as high as 8M can serve two purposes in CE applications: (a) urea can provide denaturation to polynucleotides for high precision/accurate DNA fragment separation, and (b) urea can as a reagent needed to refocus the laser beam as it travels through a capillary array bundle (leading to uniform signal distribution across an array; "spectral calibration"). For double stranded DNA experiments, the latter property of urea is necessary. However, because urea acts as a denaturant, systems for analyzing dsDNA are in tension with this property. In the absence of urea, formulations including polymer and buffer are operable in single capillary CE instruments (such as Prism310), but the same formulations provide poor spatial calibration in multiple capillary systems, such that very low signal can be observed in the center capillaries of a 24 capillary array. In addition, it was unexpected discovered that certain agents included in a capillary electrophoresis medium can provide increased resolution of DNA fragments that are as close as within 1-bp to each other. It has been accepted in the art that in order to achieve such high resolution, polymers that contain a denaturant (e.g. urea) have to be used in capillary electrophoresis media. In addition, it was discovered that slowing down electrophoretic mobility of DNA fragments by lowering the electrophoresis voltage showed no improvement in resolution, while the addition of certain agents to capillary electrophoresis media provides improved resolution. Such methods and compositions can find use in sequencing and STR fragment sizing (i.e. HID).

In some embodiments, sugars can be used as an inert chemical than does not denature the DNA that are being analyzed, but can provide other properties, such as adjusting refractive index and/or acting as resolution enhancers. Sugar can increase the viscosity of the polymer and affect separation and detection of the proteins. Sugars can also increase the refraction index of the polymer and improve the uniformity of signals across a multi-capillary array such as the 24-capillary array of 3500xL or 8-capillary array of 3500. Types of sugars include but are not limited to: any sugar and its derivatives, sugar isomers and their derivatives, pentose sugars and their derivatives, hexose sugars and their derivatives, saccharides and their derivatives, mono saccharides and their derivatives, disaccharides and their derivatives, trisaccharides and their derivatives, oligosaccharides and their derivatives, polysaccharides and their derivatives, starches, carbohydrates or starch hydrolysates, hydrogenated starch hydrolysates, the following sugars or any of their derivatives: glucose, galactose, sucrose, fructose, lactose, erythrose, arabinose, maltose, mannose, rhamnose, xylose, trehalose, sucralose, cellobiose; sugar alcohols or polyols and any of their derivatives: xylitol, lactulose, sorbitol, mannitol, maltitol, lactitol, erythritol, glycerol; agarose and its derivatives, glycogen, low molecular weight dextran (60-1500 kDa) and its derivatives. Sugar or sugar alcohols can be used individually, for example 20% of galactose or 30% of sucrose, or in combination. For example, combinations of sugars such as 10% mannose combined with 10% sucrose to make final 20% of sugar, or 10% dextran combined with 20% mannose to make final 30% of sugar. Concentrations of sugars or sugar alcohols are preferably from 0-40% in the final polymer composition.

In some embodiments, agent capable of adjusting refractive index and/or acting as resolution enhancers include, but are not limited to, a saccharide, a sugar alcohol, or a combination thereof. In some embodiments, the saccharide is a monosaccharide, a disaccharide, an oligosaccharide, or a polysaccharide.

It will be appreciated that certain of the agents recited herein can serve multiple functions in the media or compositions described herein. For example, certain compounds can act as a denaturant and/or to adjust refractive index and/or as a resolution enhancer. In certain other embodiments, the agents described herein can act in adjusting refractive index and/or acting as a resolution enhancer. In yet other embodiments, the agents may be present in the composition but, depending on prevailing reaction conditions, the expected effect on denaturation, refractive index or resolution may not be observable.

F. Aqueous Solutions/Buffers

As used herein, an aqueous solution is a solution in which the predominant solvent is water, for example, at least any of 92%, 99% or 100% $H_2O$ (v/v). Other solvents that can be included in the aqueous solution include acetonitrile or DMSO, e.g., at 1%-6% (v/v). Typically, the separation medium contains dissolved buffer salts. For example, the buffering compounds can include Tris(hydroxymethyl aminomethane) ("Tris"), N-Tris(hydroxymethyl)methyl-3-aminopropanesulfonic acid ("TAPS"), N-cuclohexyl-2-aminoethanesulfonic acid ("CHES") or the divalent metal ion chelator Ethylene Diamine Tetra-Acetic Acid ("EDTA"), for example, Tris, TAPS, EDTA; Tris Acetate EDTA or Tris Borate EDTA. In some embodiments, the composition can be buffered to a pH between about 7.0 and 8.5 In some embodiments, the composition can be buffered to a pH between about 6.0 and 9.0. In some embodiments, the composition can be buffered to a pH between 7.0 and 8.5. In some embodiments, the composition can be buffered to a pH between 6.0 and 9.0. In some embodiments, pH-buffering salts can be selected from the group consisting of Tris (Tris(hydroxymethyl) aminomethane), TAPS (3-{[1,3-dihydroxy-2-(hydroxymethyl) propan-2-yl] amino} propane-1-sulfonic acid), TES (2-{[1,3-dihydroxy-2-(hydroxymethyl) propan-2-yl] amino}ethane sulfonic acid), CHES (2-(Cyclohexyl amino) ethanesulfonic acid), EDTA (Ethylenediaminetetraacetic acid), TAPS/EDTA, TES/EDTA, Tris/TAPS/EDTA, Tris/TES/EDTA, Tris/acetate/EDTA, Tris/borate/EDTA, and Tris/CHES/EDTA.

G. Capillary Wall Coatings

The phenomenon of electroosmotic flow can result in peak broadening or shifting during electrophoresis. This phenomenon can result in misshapen DNA peaks and separation performance degradation during electrophoresis. One solution is to include a dynamically adsorbed or covalently applied coating on the inner microchannel wall that inhibits electroosmotic flow and DNA molecule interactions with the microchannel wall. Accordingly, compositions of this disclosure can optionally include a wall-coating material. Many so-called "dynamic" (spontaneously self-adsorbing) wall coating materials are known in the art. These include, for example, poly-N-hydroxyethyl acrylamide (pHEA) ("Poly-N-hydroxyethyl acrylamide: A novel hydrophilic, self-coating polymer matrix for DNA sequencing by capillary electrophoresis", M. N. Albarghouthi et al., Electrophoresis (2002) 23, 1429-1440). Other coatings include copolymers of DMA and other monomers that can form bonds to a surface, designated "MCP-1". Useful coatings, including MCP-1, are described in U.S. Pat. No. 6,410,668 (Chiari), and M. Chiari et al., "New adsorbed coatings for capillary electrophoresis" 2001 Electrophoresis 21:909-916, incorporated herein by reference. The coating materials of the '668 patent comprise a first and a second type of copolymerized monomers, said first monomer type selected from a group consisting of acrylamide, methacrylamide, N-monosubstituted acrylamide, N-monosubstituted methacrylamide, N, N-disubstituted acrylamide, and N,N-disubstituted methacrylamide; and said second monomer selected from the group consisting of glycidyl group containing monomers, diol group containing monomers and allyl group containing carbohydrate monomers. The coating materials can be present in the separation medium mixture at no more than about 2% w/w with the separation polymer, preferably no more than 1% w/w overall. Often, even lower concentrations of dissolved wall-coating polymers are useful.

H. Stability

The compositions of this disclosure can be used as a DNA separation medium for capillary electrophoresis. The compositions exhibit functional stability. As used herein, a composition exhibits "functional stability" for capillary electrophoresis if, using a capillary having a bore of 75 microns inner diameter and a length of about 30 cm, the separation medium provides single-base DNA molecule resolution up to 200 nucleotides and 4-base resolution up to 450 nucleotides, or protein, peptide, glycoprotein, glycan resolution even after storage at about 23° C. for at least any of one week, one month, two months, four months, or six months, one year, eighteen months, two years, greater than two years. Exemplary compositions for capillary electrophoresis described the Examples in Tables 1, 2A, 2B and 2C, also referred to as electrophoresis separation medium, were used for the separation and/or resolution of biomolecules such as DNA, protein, peptide, glycoprotein, glycan, and exhibited functional stability for capillary electrophoresis after storage at about 23° C. for: one month, two months, six months, one year, eighteen months, two years, greater than two years.

Typically, a gel exhibiting chemical and physical stability presents a clear and homogenous solution over time. An acrylamide polymer exhibits chemical stability if, after storage at about 23° C. for at least any of one day, one week, one month two months, four months, or six months, no more than 5%, 4%, 3% or 2% of the polymers in the composition exhibit carboxylic acid side chain moieties, e.g., as assessed by an NMR analysis of the dissolved polymer. Accordingly, the separation media provided herein do not require refrigeration at 4° C., as do other separation media.

II. Devices and Systems

This disclosure also provides devices and systems employing the separation media provided herein.

A. Microchannel Devices

Provided herein are devices comprising a solid substrate having one or more microchannels filled with a separation medium of this disclosure. Such devices are useful for performing capillary electrophoresis analysis of biomolecules, such as nucleic acids. Such devices can be made, for example, of a plastic or a glass. Capillary electrophoresis can be performed using a traditional capillary or in a microfluidic device containing one or more microchannels filled with a separation medium. Capillaries typically have a core or channel having an inner diameter between about 50 microns and 100 microns, e.g., around 75 microns. Microchannels can be pre-coated with a covalently bound material that inhibits electroosmotic flow, as an alternative to including a dissolved, dynamically absorbable coating material in the separation medium composition.

Capillaries can be loaded with separation medium using a high-pressure system. For example, gel can be contained in the space of a device comprising a barrel comprising an internal space and a plunger fitted in the space, such as a syringe, and an open end of the capillary can be put into communication, e.g., via a connecting tube, with the open tip of the device. Such devices can generate the high pressures necessary to fill and to empty a capillary with a viscous separation medium. In some embodiments, the device can include an electrode, such as an anode or cathode that communicates with the internal space. In this way, after gel injection, the syringe device functions as an electrode for electrophoresis. See, e.g., U.S. Pat. No. 5,635,050 (Pentoney).

In another aspect, this disclosure provides a kit comprising a container containing a separation medium of this disclosure and a container containing an electrophoresis buffer.

B. Systems

A system of this disclosure can be configured to analyze an analyte, e.g., DNA, by electrophoresis. Systems for carrying out capillary electrophoresis are well-known. Many references are available describing basic apparatuses and several capillary electrophoresis instruments are commercially available, e.g., the model 3730 DNA Analyzer, 3730xl DNA Analyzer, 3500xL Genetic Analyzer, SeqStudio™ Genetic Analyzer, 3130 Genetic Analyzer or 310 Genetic Analyzer instruments from Thermo Fisher Scientific. Exemplary references describing capillary electrophoresis apparatus and their operation include Jorgenson, Methods: A Companion to Methods in Enzymology, 4: 179-190 (1992); Colburn et al., Applied Biosystems Research News, issue 1 (winter 1990); Grossman et al., editors, Capillary Electrophoresis (Academic Press, San Diego, 1992); and the like.

FIG. 4 shows an exemplary electrophoresis assembly. A microchannel (e.g., a capillary) filled with a composition of this disclosure is in electrical communication with an anode and a cathode. The anode and cathode are, themselves, in electrical communication with a voltage source, such as a battery or power supply, e.g., connected through an electrical outlet. The analyte is delivered to the cathode end of the microchannel. In this example, the assembly is configured for cross-injection. The cathode can be a forked cathode to focus the analyte to the point of injection. An optical assembly comprises a light source, e.g., a laser, optics, such as lenses, and a detector, such as a spectrograph. The optical assembly is positioned so that the light beam passes through the microchannel closer to the anode, that is, in a position consistent with detecting analytes separated by electrophoresis.

Figure 5:
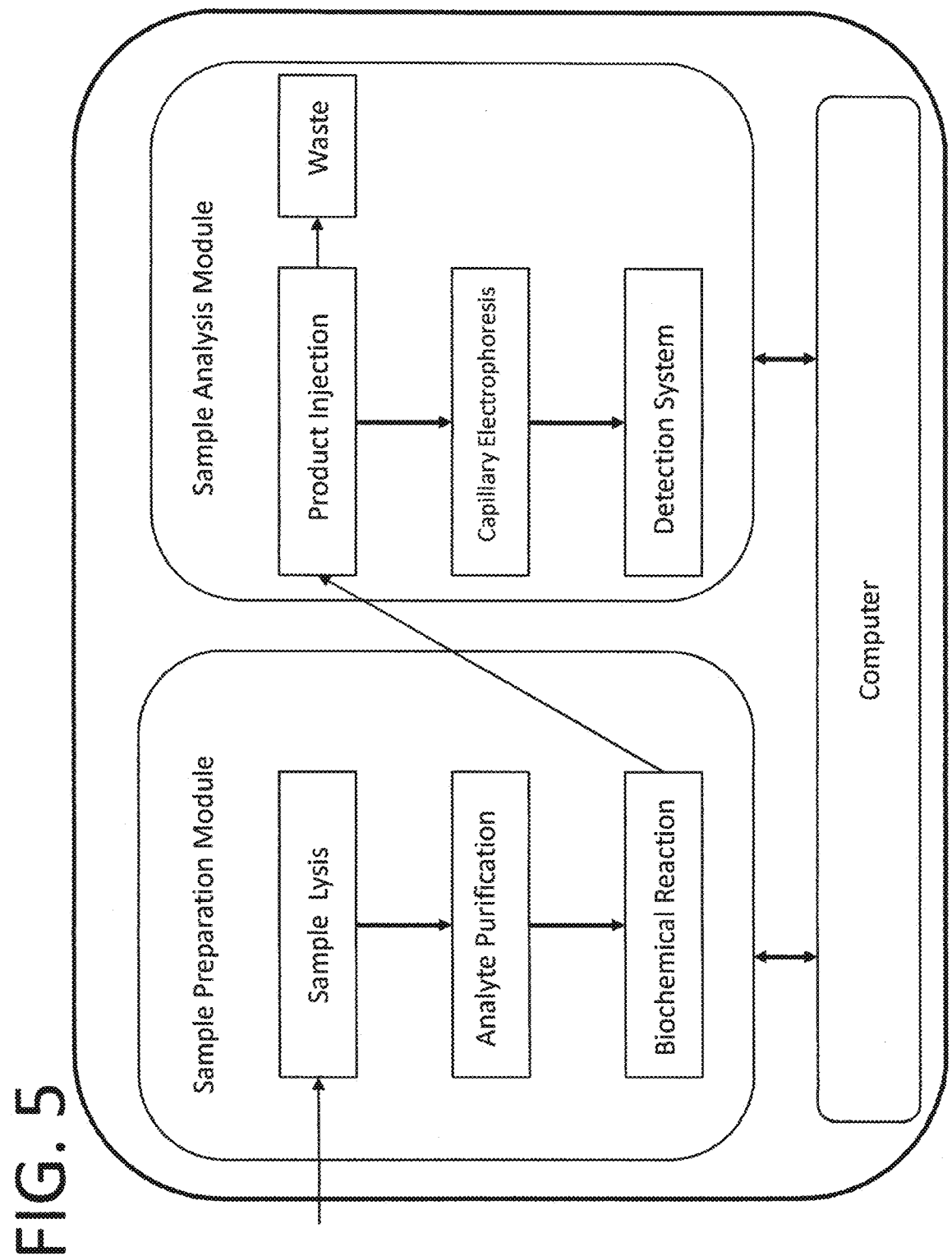
FIG. 5 shows an exemplary system for sample analysis by electrophoresis.
Figure 6A:
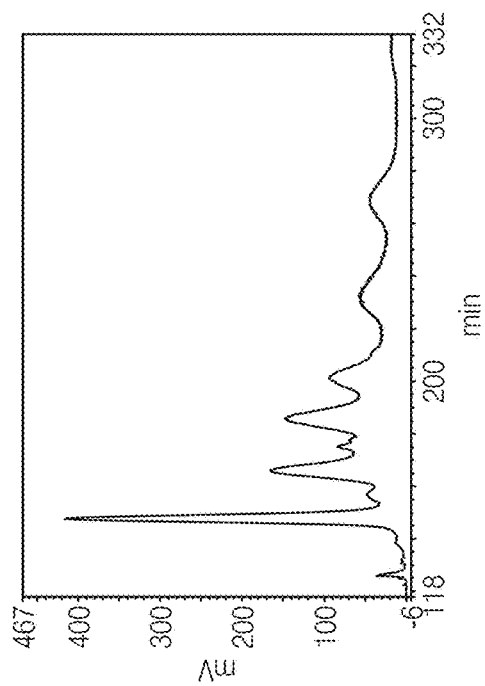
FIGS. 6a and 6b: used 2% LPA with 3M Urea.
Figure 6B:
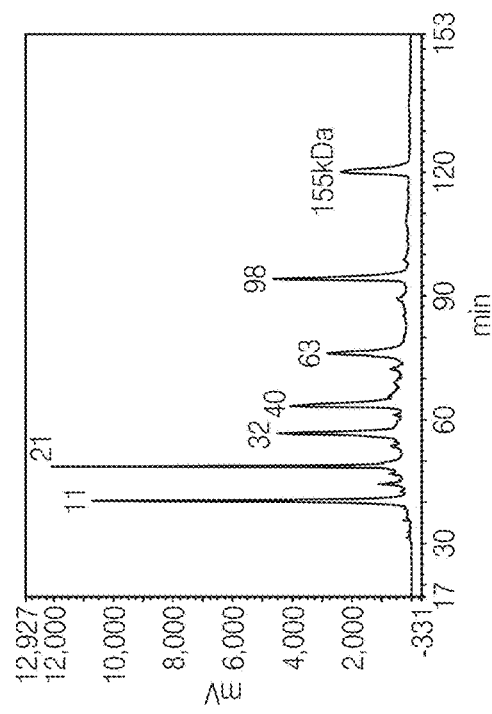
Figure 6C:
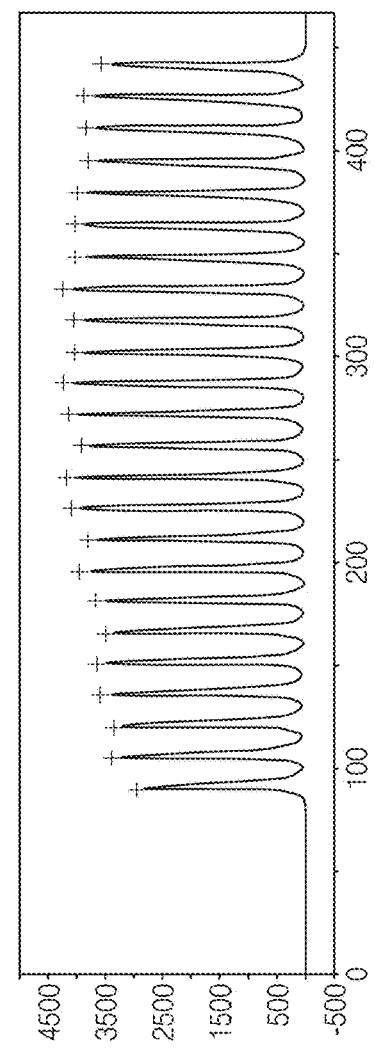
FIGS. 6c and 6d: used 2% LPA only (without urea).
Figure 6D:
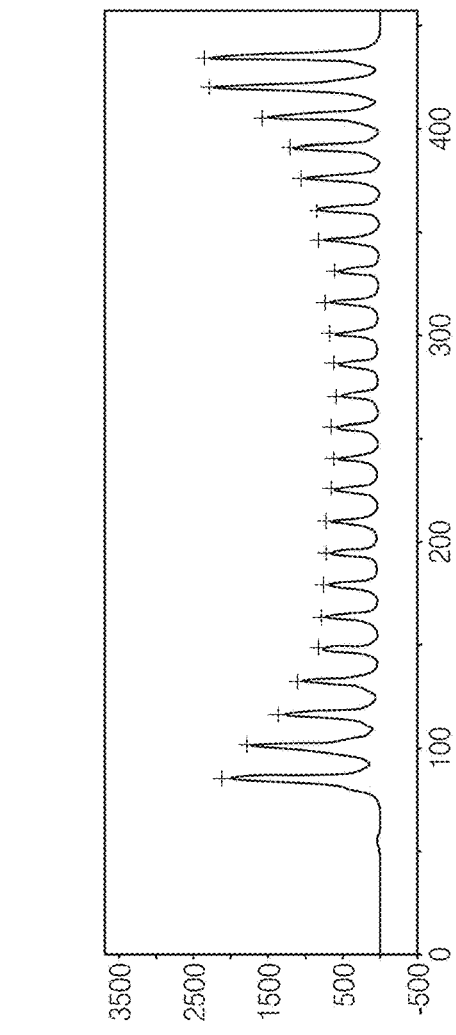
Figure 7A:
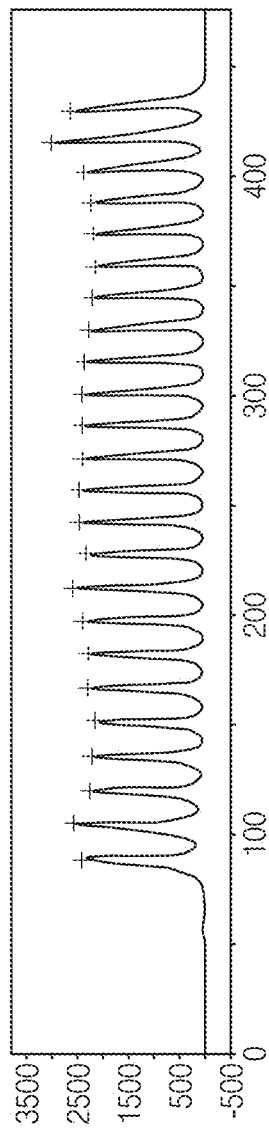
FIGS. 7a and 7b: used 2% LPA with 20% galactose and 150 mM TES.
Figure 7B:
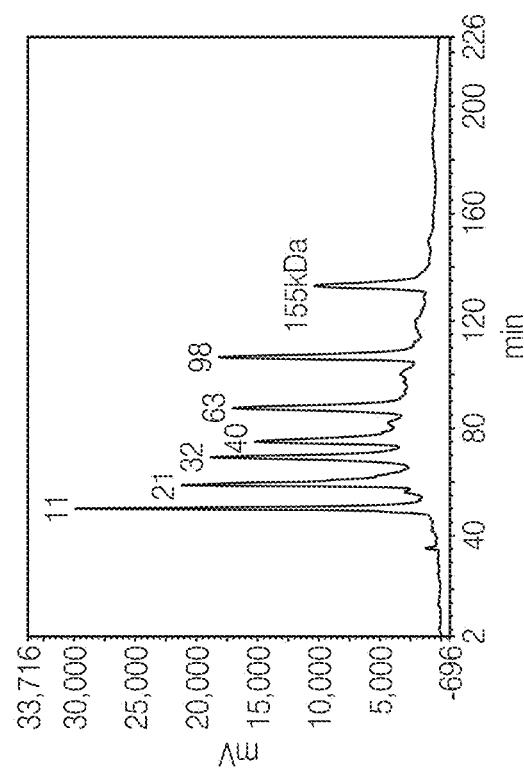
Figure 8A:
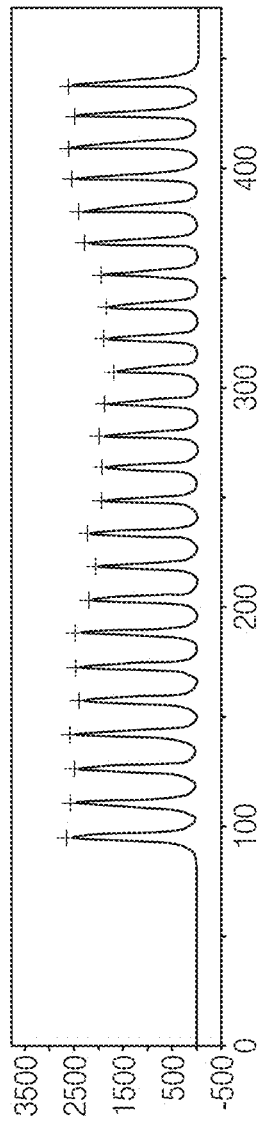
FIGS. 8a and 8b: used 2.5% LPA with 20% Xylitol and 150 mM TES.
Figure 8B:
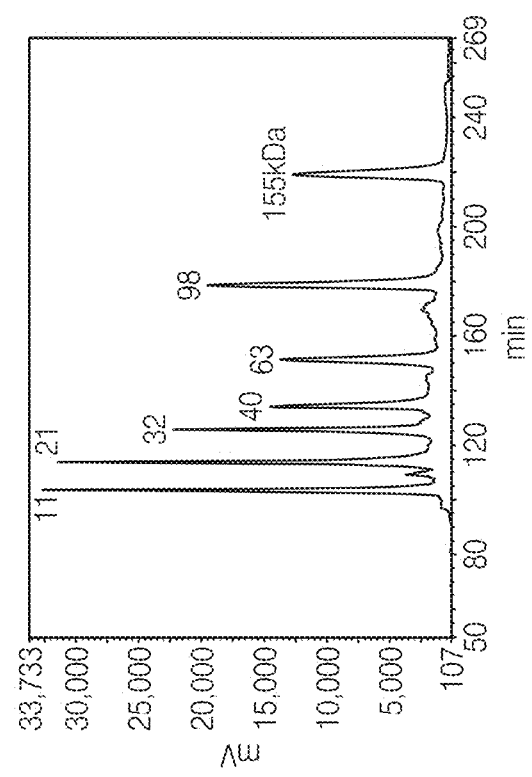
Figure 9A:
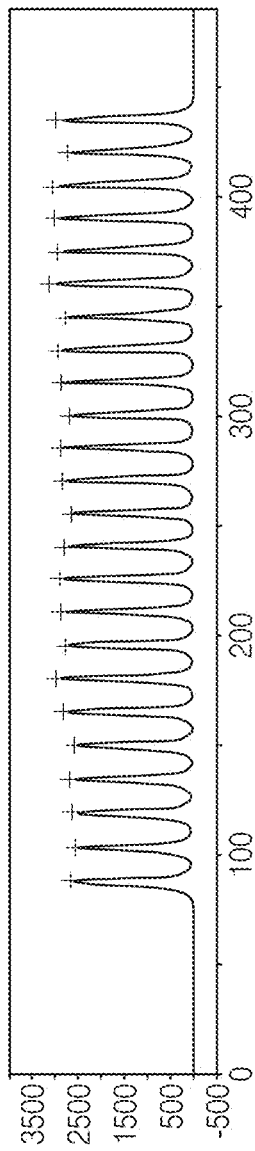
FIGS. 9a and 9b: used 2% LPA with 30% Sucrose and 150 mM TES.
Figure 9B:
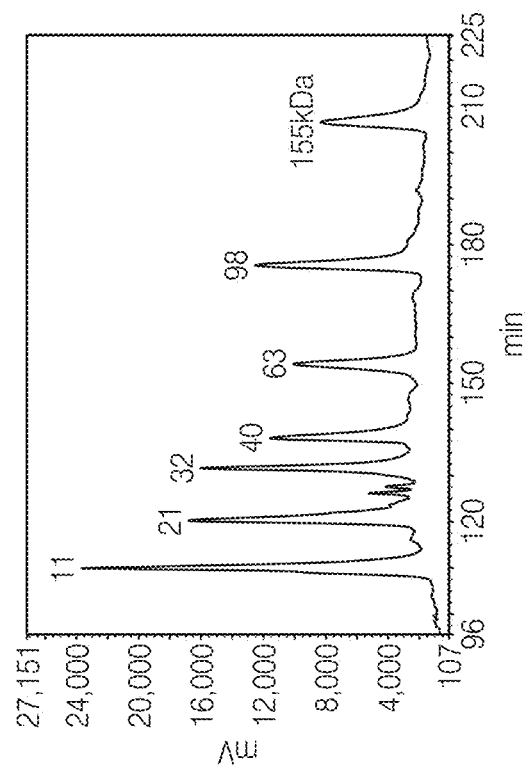
Figure 10:
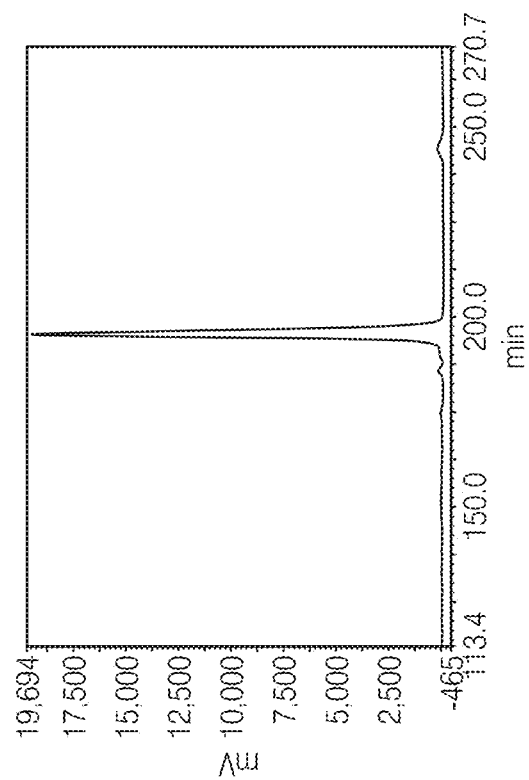
FIG. 10: Separation of purified monoclonal IgG by a polymer with galactose. Monoclonal IgG was expressed by mammalian CHO cell line. IgG was purified by chromatography and labeled with fluorogenic FQ dye at the primary amine groups. Non-reduced proteins were separated under denaturing conditions with SDS by capillary electrophoresis by 3500XL instrument. The purified protein has >90% purity of glycosylated intact IgG (large peak) calculated by dividing its area to the total area of all peaks in the electropherogram. HH: protein with 2 heavy chains (around 175.0 min). HHL: protein with 2 heavy chains (~187.5 min) and a light chain (around min), aggregate of IgG (~240.0 min).

FIG. 5 shows an exemplary system for sample analysis by electrophoresis. The system can comprise a sample preparation module and a sample analysis module. The sample preparation module can be configured to perform any of cell lysis, analyte purification (e.g., isolation of biomolecular analytes), and biochemical reaction, e.g., amplification of nucleic acid analytes. Analyte that is ready for separation is transmitted through fluidic lines to a sample analysis module. The sample analysis module can include an injection assembly for injection of analyte into the microchannel, as well as a waste module to collect uninjected sample and buffers. After analyte injection, the analyte is separated in the microchannel by electrophoresis. A detection system detects separated analytes. The system can further comprise a computer to operate the modules and to collect and analyze data generated by the analysis module. Such devices are shown, for example, in U.S. Pat. No. 8,894,946 (Nielsen et al.), incorporated herein by reference.

III. Methods

A. Methods of Making

Dimethylacrylamide and diethylacrylamide can be obtained from commercial suppliers, such as Sigma Aldrich or Monomer-Polymer and Dajac Labs (Trevose, Pa.).

N-allyl glucose and N-acryloyl-aminoethyoxyethanol-substituted acrylamide monomers are commercially available from Lucidant Polymers, Sunnyvale, Calif.

Synthesis of N-acryloyl-aminoethoxyethanol-substituted acrylamide (N-(2-hydroxyethoxy)ethyl-acrylamide). The monomer is obtained as follows: to 120 mL of CH2Cl2 are added mL (0.278 F mol) of aminoethoxyethanol and 27.6 mL (0.198 mol) of triethylamine. This solution is added dropwise with 16 mL (0.198 mol) of acryloyl chloride (at ca. 0° C.) and stirring is continued for about 2 hours at room temperature. After filtering the precipitated salts, the organic phase is washed (twice, 100 mL each time) with pH 5.5 phosphate buffer in presence of NaCl. After drying over $Na_2SO_4$, the last residues of organic solvent are evaporated in a rotavapor. The product is analyzed by TLC in $CHCl_3$/$CH_3OR$ (7:3 and then 9:1) as eluent. Yield: ca. 8 g. The product is purified on a silica column, eluted first with $CH_2Cl_2$/$CH_3OH$ (95:5) and then with $CH_2Cl_2$/$CH_3OH$ (9:1). (See U.S. Pat. No. 5,470,916 (Righetti et al.).)

Betaine, acetonitrile, proline, histidine, imidazole, DMSO, N-methyl-2-pyrrolidinone, 3-(1-pyridinio)-1-propanesulfonate and trehalose are available from, e.g., Sigma Aldrich. Synthesis of 2-N,N,N-Tri-n-butylammonium acetate is described in Koumoto et al., Tetrahedron (64) 2008, 168-174.

Electrophoresis separation media can be produced following the methods of formulation and dissolution disclosed in many publications, for instance: "Ultra-fast DNA sequencing on a microchip by a hybrid separation mechanism that gives 600 bases in 6.5 minutes", C. P. Fredlake et al., *Proc. Natl. Acad. Sci. USA* (2008) 105, 476-481. PMCID: PMC2206561. The average molar mass of the sieving polymers or copolymers used to separation DNA according to size can be measured following methods disclosed in the paper: "The use of light scattering for precise characterization of polymers for DNA sequencing by capillary electrophoresis", B. A. Buchholz and A. E. Barron, *Electrophoresis* (2001) 22, 4118-4128].

B. Methods of Using

This disclosure provides methods of electrophoretically separating biomolecular analytes using a separation medium as disclosed herein. The separation media of this disclosure exhibit chemical stability at ambient temperatures, such as room temperature (about 20° to 25° C., e.g., about 23° C.). So, for example, after formulation (in particular, after putting the denaturing compound into solution) the separation media of this disclosure can be stored for at least any of one day (i.e., 24 hours), one week, one month, six months or one year at temperatures above 4° C., above 15° C., above 20° C., above 25° C. or above 30° C. For example, the composition can be stored between about 15° C. and 40° C. Accordingly, the separation media of the disclosure are useful for settings remote from a full laboratory. Such settings include, for example, those in which the user is not practically able to freshly formulate the separation media or store electrophoresis media in a separate refrigerator. These include, for example, a point-of-care setting (e.g., a hospital, ambulance), a police station (e.g., a booking station) setting or a combat zone (e.g., a battlefield or war zone). The separation medium can be injected into the microchannel at the time of use, or can be stored in the microchannel of a device, such as a microfluidic device or a capillary, in anticipation of future use. Accordingly, the device can be a consumable device that is replaced in an electrophoresis instrument.

Separation media of this disclosure are particularly useful in the analysis of nucleic acids. This includes DNA and RNA. Typically, before being introduced into the separation medium, the nucleic acid is denatured to separate duplexes of DNA-DNA, DNA-RNA or RNA-RNA. Double-stranded regions within a molecule, such as hairpins or stem-loop structures, also can be denatured before analysis. Polynucleotides for analysis by electrophoretic separation can have average lengths of no more than about 1300 nucleotides.

Separation media also can be used to separate and detect peptides, proteins, glycoproteins, glycans or complexes of nucleic acids (DNA or RNA) and proteins. Such media can also have use for lipoprotein analysis. Exemplary separation media for capillary electrophoresis are described the Examples in Tables 1, 2A, 2B and 2C, are also referred to as electrophoresis separation medium in this disclosure, and these were used for the separation and/or resolution of biomolecules such as DNA, proteins, peptides, glycoproteins, glycans.

In some embodiments, the separation of biomolecules using the disclosed sieving compositions or electrophoresis separation media is preceded by sample preparation. The sample preparation can include one or more steps such as cell lysis, DNA or RNA extraction, preparation of cDNA from RNA. Optionally, the nucleic acid can be amplified prior to separation, including via polymerase chain reaction (PCR). The nucleic acid amplification can include thermal cycling or isothermal amplification. In some embodiments, the nucleic acid is amplified using target-specific PCR, including singleplex or multiplex PCR. In some embodiments, the nucleic acid is amplified using non-specific PCR such as whole genome amplification (WGA) and/or priming with random or degenerate primers. In some embodiments, the nucleic acid amplification products can include universal sequences that were present in the primers used for amplification. In some embodiments, universal sequences can be appended to the amplified product, for example via ligation. In some embodiments, the amplified products can include a short sequence (bar code) that identifies the source of the amplification product. The bar code can optionally identify the tissue or cell sample from which the amplification product originated. In some embodiments, the bar code identifies the template nucleic acid molecule that was copied to form the amplification product (e.g., molecular or stochastic bar coding).

In some embodiments, sample preparation for protein and or glycoprotein analysis can include one or more steps such as cell lysis, protein extraction, and optionally purification steps using suitable methods such as antibody coated beads, flocculants, purification columns, etc. Sample preparation may or may not involve protein labeling with a suitable dye, including but not limited to, fluorescent dyes. Sample preparation for glycan analysis may further involve the use of glycan cleaving enzymes such as endoglycosidases, including but not limited to PNGase. Sample preparation may be manual or automated.

In some embodiments, the analysis involves detecting genetic alleles based on size. One example of this is detection of alleles at one or more short tandem repeat ("STR") loci. DNA can be subject to multiplex amplification of a plurality of STR loci. The loci can be, for example, STR loci used for identity testing, e.g., for forensic or paternity testing. Thirteen core loci used in the CODIS system include CSF1PO, FGA, THO1, TPOX, VWA, D3S1358, D5S818, D7S820, D8S1179, D13S317, D16S539, D18S51, D21S11. In some embodiments, the analysis involves separation of non-CODiS loci. Optionally, the analysis includes determining or identifying the source (e.g., human individual, animal or cell culture sample) from which the genetic material was obtained. In some embodiments, the analysis includes identifying a father of a known individual or animal (e.g., paternity testing).

In other embodiments, a desired locus is amplified and then subject to sequencing reactions, such as Sanger sequencing or Maxam-Gilbert sequencing. These methods create DNA ladders which, upon analysis by capillary electrophoresis, indicate the identity of a terminal base from which, in turn, a nucleotide sequence can be determined.

For example, the separation medium can be used in the detection, e.g., sequencing, of diagnostic alleles. For example, the alleles can be from an MHC (major histocompatibility complex) gene, for example, for tissue matching in a transplant situation. Alternatively, the allele can be from an oncogene (tumor promoter or tumor suppressor) for cancer diagnosis. All publications and patent applications mentioned in this specification are herein incorporated by reference to the same extent as if each individual publication or patent application was specifically and individually indicated to be incorporated by reference.

While certain embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

EXAMPLES

Sugar Polymer Formulations for Capillary Electrophoresis of Biomolecules

Multiple capillary electrophoresis systems such as the 3500 and 3500xL have advantages over single capillary electrophoresis systems in that they provide rapid and high throughput analysis of DNA, peptides, proteins, glycoproteins, glycans, etc. However, since current polymers contain about 7M urea, the resolution of peptides, proteins, glycoproteins is greatly reduced in the presence of urea. Without urea, the base polymers we studied showed good separation of proteins. But the removal of urea from the polymer changed the refractive property and resulted in great differences in signal intensity amongst the capillaries. Therefore, comparison of runs between capillaries produces spurious results.

We investigated various urea and non-urea substitutes in electrophoresis separation medium for separating DNA, proteins, peptides, glycoproteins, or glycans. The terms electrophoresis separation medium, sieving polymer, polymer compositions/formulations, or sugar polymer compositions/formulations may be used interchangeably. To substitute urea, we found that the addition of sugars to the sieving polymer/copolymer mix can greatly correct the refractive index problem amongst the 24 capillaries as well as give good separation of proteins. Thus, we screened hundreds of polymer/copolymer mixes of varying percentages together with different sugars (also at varying percentages) to generate the electrophoresis separation medium, sieving polymer, polymer compositions/formulations, or sugar polymer compositions/formulations. Sugar polymer formulations were selected based on their ability to give uniform signals across 24 capillaries and their ability to resolve proteins/peptides/glycoproteins/glycans sharply. Additional parameters were noted during separations and contributed to selection: highest and lowest signals, signal height, solubility of the material, final viscosity, polymer uptake into an array, ability to remove bubbles, run time, reproducibility of results, etc. We found that the addition of sugars can not only replace urea, but can also correct the refractive index problem amongst the 24 capillaries (see FIGS. 6-10). The exemplary sugar polymer formulations studied showed good separation of proteins and glycoproteins (see Tables 1 and 2 for formulations). These sugar polymers can also be used for the analyses of other biomolecules including DNA, peptides, and glycans. These are applicable to various capillary electrophoresis instruments such as the 3130, 3730, and 3500/3500xl.

Since high molecular weight dextran, PEG, and polyacrylamide have been reported in protein separation by capillary electrophoresis, we decided to test these materials in protein separation to make the final sugar polymer formulations, sieving polymer/copolymer of up to 6% were used—for e.g. up to 6% LPA, or a combination of LPA+PMDA up to 6%, or PMDA alone up to 6%, or 5-20% dextran (1500 kDa) and so on. Sugars were incorporated from about 1% to 30%. Exemplary formulations are shown in Tables 1 and in Tables 2A-C below.

Sugars are used as inert chemicals that do not react with the protein that are being analyzed. Sugar can increase the viscosity of the polymer and affect separation and detection of the proteins. Sugars can also increase the refraction index of the polymer and improve the uniformity of signals across a multi-capillary array such as the 24-capillary array of 3500xL or 8-capillary array of 3500. Types of sugars include but are not limited to: any sugar and its derivatives, sugar isomers and their derivatives, pentose sugars and their derivatives, hexose sugars and their derivatives, saccharides and their derivatives, mono saccharides and their derivatives, disaccharides and their derivatives, trisaccharides and their derivatives, oligosaccharides and their derivatives, polysaccharides and their derivatives, starches, carbohydrates or starch hydrolysates, hydrogenated starch hydrolysates, the following sugars or any of their derivatives: glucose, galactose, sucrose, fructose, lactose, erythrose, arabinose, maltose, mannose, rhamnose, xylose, trehalose, sucralose, cellobiose; sugar alcohols or polyols and any of their derivatives: xylitol, lactulose, sorbitol, mannitol, maltitol, lactitol, erythritol, glycerol; agarose and its derivatives, glycogen, low molecular weight dextran (60-1500 kDa) and its derivatives. Sugar or sugar alcohols is used individually, for example 20% of galactose or 30% of sucrose, or in combination. For example, combinations of sugars such as 10% mannose combined with 10% sucrose to make final 20% of sugar, or 10% dextran combined with 20% mannose to make final 30% of sugar. Concentrations of sugars or sugar alcohols are preferably from 0-40% in the final polymer composition.

TABLE 1

Screening of exemplary sugar polymer formulations

| Polymer | Difference (H − L) | % Difference H − L/H |
|---|---|---|
| POP-7 (LPA + urea) | 1237 | 29.20% |
| LPA | 1909 | 75.10% |
| 2% LPA + 30% Sucrose 150 mm TES | 1014 | 30.18% |
| 2.5% LPA 20% Xylitol 150 mm TES | 1039 | 35.96% |
| 2% LPA + 20% Galactose 150 mm TES | 560 | 17.09% |

TABLE 2A

Exemplary Xylitol compositions

| Polymer | % Δ(H − L)/H |
|---|---|
| POP-7 (LPA based polymer with 7M urea) | 20.50 |
| 1.5-2.5% LPA 12.5% Xylitol 115 mM TES | 62.27 |
| 1.5-2.5% LPA 20% Xylitol 80 mM TES | 39.71 |
| 1.5-2.5% LPA 20% Xylitol 80 mM TES | 38.83 |
| 1.5-2.5% LPA 5% Xylitol 150 mM TES | 64.05 |
| 1.5-2.5% LPA 20% Xylitol 150 mM TES | 41.87 |
| 1.5-2.5% LPA 5% Xylitol 150 mM TES | 62.69 |
| 1.5-2.5% LPA 20% Xylitol 150 mM TES | 35.96 |
| 1.5-2.5% LPA 5% Xylitol 80 mM TES | 64.20 |
| 1.5-2.5% LPA 5% Xylitol 80 mM TES | 66.49 |

TABLE 2B

Exemplary Sucrose compositions

| Polymer | % Δ(H − L)/H |
|---|---|
| POP-7 (LPA based polymer with 7M urea) | 20.50 |
| 1.5-2.5% LPA 12.5% Sucrose 115 mM TES | 61.65 |
| 1.5-2.5% LPA 20% Sucrose 80 mM TES | 35.75 |
| 1.5-2.5% LPA 20% Sucrose 80 mM TES | 43.35 |
| 1.5-2.5% LPA 5% Sucrose 150 mM TES | 62.60 |
| 1.5-2.5% LPA 20% Sucrose 150 mM TES | 37.97 |
| 1.5-2.5% LPA 5% Sucrose 150 mM TES | 61.58 |
| 1.5-2.5% LPA 20% Sucrose 150 mM TES | 32.72 |
| 1.5-2.5% LPA 5% Sucrose 80 mM TES | 63.29 |
| 1.5-2.5% LPA 5% Sucrose 80 mM TES | 67.67 |

TABLE 2C

Exemplary Galactose compositions

| Polymer | % Δ(H − L)/H |
|---|---|
| 1.5-2.5% LPA 12.5% Galactose 115 mM TES | 50.80 |

TABLE 2C-continued

Exemplary Galactose compositions

| Polymer | % Δ(H − L)/H |
|---|---|
| 1.5-2.5% LPA 20% Galactose 150 mM TES | 38.30 |
| 1.5-2.5% LPA 5% Galactose 150 mM TES | 56.65 |
| 1.5-2.5% LPA 5% Galactose 150 mM TES | 36.40 |
| 1.5-2.5% LPA 20% Galactose 150 mM TES | 29.10 |
| 1.5-2.5% LPA 20% Galactose 80 mM TES | 32.90 |
| 1.5-2.5% LPA 20% Galactose 80 mM TES | 36.70 |
| 1.5-2.5% LPA 5% Galactose 80 mM TES | 62.10 |
| 1.5-2.5% LPA 5% Galactose 80 mM TES | 32.70 |

Legends for Tables 2A-C

H: Highest intensity among the 24 capillaries in the same capillary array of 3500xL L: Lowest intensity among the 24 capillaries in the same capillary array of 3500xL Δ(H−L): Difference between the highest and lowest signal intensity % Δ(H−L)/H: Intensity difference divided by the highest intensity expressed in percentage. (A smaller number means better signal uniformity across 24 capillaries in the same array.)

To perform the experiments described in Examples 1-4 below, the runs were performed as described below on the Thermo Fisher 3500xL-24 capillary instrument. However, other multi-capillary instruments, as well as single capillary instruments, for e.g. AB Sciex PA800 Plus or Agilent's CE instruments may also be utilized. In these experiments, a standard protein mixture (LC 5928) containing protein fragments from 11-155 kDa (11, 21, 32, 40, 63, 98 and 155 kDa) was used to evaluate the polymer resolution capability. The results are shown in FIGS. 6-10, and the details are described in the Description of the Figures.

Example 1. Separation of Proteins Under Denaturation Conditions

Protein separation based on the molecular weight in the presence of the detergent SDS.

1.1 Polymer Compositions

Polymers are composed of a major sieving material (polyacrylamide or polydimethylacrylamide), a denaturation reagent such as SDS, a buffer, and with or without sugar(s). For electrophoresis systems that do not need correction of refractive index of the polymer, sugar may not be necessary, unless addition of sugars improves resolution. Resolution of proteins, glycoproteins, glycans or peptides depends on the concentrations of each component, type of buffer, and pH, and the and running conditions such as temperature, running voltages, and running buffer.

TABLE 3

Use of polyacrylamide as the major sieving polymer

| | |
|---|---|
| Polyacrylamide (500-1500 kDa) | 1-4% |
| Polydimethylacrylamide (500-1500 kDa) | 0.06%-1.2% |
| SDS (denaturation reagent) | 0.04-0.2% |
| Buffer | TES, or TAPS (50-150 mM) |

TABLE 3-continued

Use of polyacrylamide as the major sieving polymer

| | |
|---|---|
| phosphate | 6-9 |
| Sugar | 0-40% |
| MilliQ ™ water | |

TABLE 4

Use of polydimethylacrylamide as the major sieving polymer

| | | |
|---|---|---|
| Polydimethylacrylamide (500-1500 kDa) | 2%-6% | |
| SDS (denaturation reagent) | 0.04-0.2% | |
| Buffer | TES, TAPS | 50-150 mM |
| phosphate | 6-9 | |
| Sugar | 0-40% | |
| MilliQ ™ water | | |

Exemplary buffers used: TES: 2-[[1,3-dihydroxy-2-(hydroxymethyl)propan-2-yl]amino]ethanesulfonic acid
TAPS: 3-{[1,3-dihydroxy-2-(hydroxymethyl)propan-2-yl]amino}propane-1-sulfonic acid
Separation and resolution of proteins Different proteins are shown as peaks on the electropherograms (FIGS. 6-10); also see Description of Figures. Proteins with molecular weights from ~8 to ~250 kDa were separated. Resolution of proteins depends on the concentrations of the LPA and PDMA, sugar, buffer, and running conditions of electrophoresis. For better resolution of small proteins and peptides, the concentration of LPA or PDMA is higher.

Protein Sizing

Proteins of known sizes is calibrated as molecular weight standards for comparison. A plot of migration time vs. molecular weight as a standard is used to size an unknown protein from its migration time on the plot.

Relative Quantitation of Proteins

Peak area is analyzed and obtained by a data analysis program such as Chromeleon™. Relative quantitation of each peak represents a protein of a specific molecular weight, and is calculated by dividing its area to the total area. Relative quantitation can determine the purity of a purified protein sample.

Stability of Polymer

Sugars are stable molecules at room temperature. The polymers described in Tables 1, 2A, B, C were stable for protein separation for several months, and continue to remain stable at room temperature even after 18 months of storage, indicating that no growth of micro-organisms occurred in the sugar polymers.

1.2 Method for the Separation and Detection of Proteins Labeled with a Fluorescent Dye by Capillary Electrophoresis Proteins were labeled with a suitable fluorescent dye that is detected by the excitation and emission system of the system. For Thermo Fisher's 3500 or 3500xL capillary electrophoresis instruments, the dyes include (but are not limited to) FAM, Alexa 400, LIZ, FQ etc. Proteins is labeled at primary amines such as the amino group at the N-terminus or the lysine residues, or labeled at the sulfur group of cysteines.

1. Prepare the labeled protein in a sample injection buffer. The sample injection buffer includes a buffer, and a denaturation reagent. The following table shows the example of sample injection buffers.

TABLE 5

| Injection Buffer 1 | Injection Buffer 2 | Injection Buffer 3 |
| --- | --- | --- |
| 0.5-2% SDS<br>50-100 mM Tris-HCl<br>pH 7.4-9.5 | 0.5-2% SDS<br>40-90 mM citric acid<br>85-170 mM Na$_2$HPO$_4$<br>pH 6-7 | 0.5-2% SDS<br>10-60 mM sodium phosphate<br>pH 5-8 |

2. For non-reducing separation of proteins, incubate the mixed sample at 70° C. for 5 min. For reducing separation of proteins, a reducing reagent such 10 mM of β-mercaptoethanol, or DTT (dithiothreitol) is added in the injection buffer. The sample is then incubated at 70-90° C. for 10 min.

3. Transfer the prepared samples to a tube or a multi-well plate.

4. Set up the polymer, running buffer, and sample plate following the instruction of the capillary electrophoresis instrument.

5. Following the instruction of the instrument to set up the injection and separation running protocols. Perform separation and detection of proteins by the following conditions with the correct excitation wavelength and emission detection filter.

TABLE 6

| Capillary | 22-80 cm |
| --- | --- |
| Injection voltage | 5-10 kV |
| Injection temperature | Room temperature |
| Injection time | 10-40 seconds |
| Running buffer | 50-150 mM TES or TAPS |
| Denaturation reagent in running buffer | 0.04-0.2% SDS |
| phosphate | 6-9 |
| Separation running temperature | 20-60° C. |
| Separation running voltage | 8-18 kV |
| Separation running time | 2000-5000 seconds |

1.3 Method for the Separation and Detection of Un-Labeled Proteins by Capillary Electrophoresis Proteins are not labeled and instead, are detected by their intrinsic fluorescence of tyrosine, tryptophan, and phenylalanine amino acids within the protein, or by UV at 214, 220, or 280 nm wavelength.

1. Mix protein with a sample injection buffer. The sample injection buffer is as shown in Table 5 above, includes a buffer, and a denaturation reagent.

2. For non-reducing separation of proteins, add a methylation reagent such as iodoacetamide or N-ethylmaleimide at 10 mM and incubate the mixed sample at 70° C. for 10 min.

3. For reducing separation of proteins, a reducing reagent such 10 mM of β-mercaptoethanol, or DTT (dithiothreitol) is added in the injection buffer. The sample is then incubated at 70-90° C. for 10 min.

4. Transfer the prepared samples to a tube or a multi-well plate.

5. Set up the polymer, running buffer, and sample plate following the instruction of the capillary electrophoresis instrument.

6. Follow the instruction of the instrument to set up the injection and separation running protocols. Run conditions are as described in Table 6 above. Perform separation and detection of proteins by the following conditions with the correct excitation wavelength and emission detection filter.

Example 2. Separation of Proteins Under Native Conditions: Proteins are Separated without Denaturation 2.1 Polymer Composition Polymer compositions are similar, except that no denaturation reagent such as SDS will be used in the polymers and any reagents.

2.2 Method for the Separation and Detection of Proteins Labeled with a Fluorescent Dye by Capillary Electrophoresis Proteins are labeled with a suitable fluorescent dye that is detected by the excitation and emission system of the system. For Thermo Fisher's 3500 or 3500xL capillary electrophoresis instruments, the dyes include (but are not limited to) FAM, Alexa 400, LIZ, FQ etc. Proteins is labeled at primary amines such as the amino group at the N-terminus or the lysine residues, or labeled at the sulfur group of cystines.

1. Prepare the labeled protein in a sample injection buffer at room temperature. The sample injection buffer includes a buffer, and a denaturation reagent. The following table shows the example of sample injection buffers.

TABLE 7

| Injection Buffer 1 | Injection Buffer 2 | Injection Buffer 3 |
| --- | --- | --- |
| 50-100 mM Tris-HCl<br>pH 7.4-9.5 | 40-90 mM citric acid<br>85-170 mM Na$_2$HPO$_4$<br>pH 6-7 | 10-60 mM sodium phosphate<br>pH 5-8 |

2. Transfer the prepared samples to a tube or a multi-well plate.

3. Set up the polymer, running buffer, and sample plate following the instruction of the capillary electrophoresis instrument.

4. Following the instruction of the instrument to set up the injection and separation running protocols. Perform separation and detection of proteins by the following conditions with the correct excitation wavelength and emission detection filter.

TABLE 8

| Capillary | 22-80 cm |
| --- | --- |
| Injection voltage | 5-10 kV |
| Injection temperature | Room temperature |
| Injection time | 10-40 seconds |
| Running buffer | 50-150 mM TES or TAPS |
| phosphate | 6-9 |
| Separation running temperature | 20-60° C. |
| Separation running voltage | 8-18 kV |
| Separation running time | 2000-5000 seconds |

2.3 Method for the Separation and Detection of Un-Labeled Proteins by Capillary Electrophoresis Proteins are not labeled and will be detected by intrinsic fluorescence of tyrosine, tryptophan, and phenylalanine amino acids in the protein or by UV at 214, 220, or 280 nm wavelength.

1. Mix protein with a sample injection buffer at room temperature. The sample injection buffer includes a buffer, and a denaturation reagent. The sample injection buffer is as shown in Table 7 above.

2. Transfer the prepared samples to a tube or a multi-well plate.

3. Set up the polymer, running buffer, and sample plate following the instruction of the capillary electrophoresis instrument.

4. Following the instruction of the instrument to set up the injection and separation running protocols. Run conditions are as described in Table 6 above. Perform separation and detection of proteins by the following conditions with the correct excitation wavelength and emission detection filter.

Example 3. Separation of Peptides Under Denaturation Conditions

Peptides are molecules composed of small number of amino acids covalently linked by peptide bonds. Molecular weights in general are smaller than 10 kDa. Peptide separation is based on the molecular weight in the presence of the detergent SDS.

3.1 Polymer Compositions

Compositions of polymers are similar to those for protein separation. Since the molecular weights are smaller, concentration of polymers such as polyacrylamide, polydimethylacrylamide, PEG or dextran may be higher.

3.2 Method for the Separation and Detection of Peptides Labeled with a Fluorescent Dye by Capillary Electrophoresis Peptides are labeled with a suitable fluorescent dye that is detected by the excitation and emission. For Thermo Fisher's 3500 or 3500xL capillary electrophoresis instruments, the dyes include (but are not limited to) FAM, Alexa 400, LIZ, FQ etc. Peptides are labeled at primary amines such as the amino group at the N-terminus, or at lysine residues, or at the sulfur group of cysteines.

1. Prepare the labeled peptides in a sample injection buffer. The sample injection buffer includes a buffer, and a denaturation reagent. The sample injection buffer is as shown in Table 5 above.

2. To prevent cross linking of peptides with cysteines, a reducing reagent such 10 mM of β-mercaptoethanol, or DTT (dithiothreitol) is added in the injection buffer. The sample is then incubated at 70-90° C. for 10 min.

3. Set up the polymer, running buffer, and sample plate following the instruction of the capillary electrophoresis instrument.

4. Following the instruction of the instrument to set up the injection and separation running protocols. Conditions are as described in Table 6 above. Perform separation and detection of proteins by the following conditions with the correct excitation wavelength and emission detection filter.

3.3 Method for the Separation and Detection of Un-Labeled Proteins by Capillary Electrophoresis Peptides are not labeled and are detected by intrinsic fluorescence of tyrosine, tryptophan, and phenylalanine amino acids in the protein or by UV at 214, 220, or 280 nm wavelength.

1. Mix peptides with a sample injection buffer. The sample injection buffer includes a buffer, and a denaturation reagent. The sample injection buffer is as shown in Table 5 above.

2. To prevent cross linkage of peptides with cysteines, a reducing reagent such 10 mM of β-mercaptoethanol, or DTT (dithiothreitol) is added in the injection buffer. The sample is then incubated at 70-90° C. for 10 min.

3. Transfer the prepared samples to a tube or a multi-well plate.

4. Set up the polymer, running buffer, and sample plate following the instruction of the capillary electrophoresis instrument.

5. Following the instruction of the instrument to set up the injection and separation running protocols. Conditions are as described in Table 6 above. Perform separation and detection of proteins by the following conditions with the correct excitation wavelength and emission detection filter.

Example 4. Separation of Glycans 4.1 Polymer Compositions: Compositions of Polymers are Similar to Those for Protein Separation.

4.2 Method for the Separation and Detection of Glycans

Peptides are labeled with a suitable fluorescent dye that is detected by the excitation and emission system of the system. For Thermo Fisher's 3500 or 3500xL capillary electrophoresis instruments, the dyes include (but are not limited to) APTS, TEAL, and Turquoise. N-glycans that are attached to the asparagine amino acid on the protein is released by the deglycosylation reaction, and labeled with one of these three dyes as described in the procedures of these Thermo Fisher products (GlycanAssure™ APTS Kit Cat. no. A28676; GlycanAssure™ Teal Kit Cat. no. A28677; GlycanAssure™ Turquoise Kit Cat no. A28678).

1. Prepare the labeled peptides in a sample injection buffer as described in the instruction of GlycanAssure™ procedure.

2. Set up the polymer, running buffer, and sample plate following the instruction of the capillary electrophoresis instrument.

3. Following the instruction of the instrument to set up the injection and separation running protocols. Perform separation and detection of proteins by the following conditions with the correct excitation wavelength and emission detection filter.

TABLE 9

| Capillary | 22-80 cm |
|---|---|
| Injection voltage | 10-19.5 kV |
| Injection temperature | Room temperature |
| Injection time | 10-40 seconds |
| Running buffer | 50-150 mM TES or TAPS |
| Denaturation reagent in running buffer | 0.04-0.2% SDS |
| pH | 6-9 |
| Separation running temperature | 20-60° C. |
| Separation running voltage | 8-18 kV |
| Separation running time | 2000-5000 seconds |

Example 5

Synthesis of Poly(N,N-dimethylacrylamide)

To a 500 mL 3 neck round bottom flask equipped with an argon gas inlet, temperature probe, and 1 rubber septa (equipped with a syringe needle as an argon gas outlet) was added 325 g of water followed by 12.0 g N,N-dimethylacrylamide. The flask was placed in a heated oil bath and purging of the mixture with argon was begun while being stirred at 150 rpm with an overhead stirrer (2 inch teflon blade). The temperature of the reaction mixture was raised to 50 C using the oil bath and monitored with a digital thermometer. When the reaction mixture reached 50 C, 1.75 mL of 2-butanol and a 2.0 g sample of 4.0 wt % ammonium persulfate in water was added to the solution by syringe. The temperature increased to about 52 C after about 35 min and the reaction was allowed to stir under argon. The reaction was stirred for an additional 2 hr after peak exotherm of the reaction. Heating of the reaction mixture was stopped, about 50 g of deionized water was added and the reaction mixture was stirred rapidly to mix air into the solution and quench the reaction. Ultrafiltration was used to remove unreacted or low molecular weight impurities and to concentrate the solution to about 13 wt % polymer.

Example 6

A. Gel Formulations and Stability Testing 1,3-Dimethylurea (Tokyo Chemical Industry) was recrystallized prior to use. A gel formulation suitable for use in capillary electrophoresis was prepared as follows. To a 50 mL flask was added 8.59 g of a 13.1 wt % solution of Polydimethylacrylamide, 5.40 g of 1,3-dimethylurea, 2.4 g of 3730 Buffer (10×) (Applied Biosystems), and 13.61 g of water. The mixture was stirred for 2 hours, to yield a solution containing 3.75 wt % polydimethylacrylamide and 18 wt % (1.75M) 1,3-dimethylurea.1,1-Dimethylurea (Chem-Impex) was recrystallized prior to use. A gel formulation suitable for use in capillary electrophoresis was prepared as follows. To a 50 mL flask was added 8.59 g of a 13.1 wt % solution of Polydimethylacrylamide, 5.40 g of 1,3-dimethylurea, 2.4 g of 3730 Buffer (10×) (Applied Biosystems), and 13.61 g of water. The mixture was stirred for 2 hours, to yield a solution containing 3.75 wt % polydimethylacrylamide and 18 wt % (1.75M) 1,1-dimethylurea.

Using the methods described above, the formulations in Table 10 were prepared. The conductivity of the formulations was tested at day 0, and at day 10 after storage at 37° C. The results indicate that while the formulation with 7M urea showed significant change in conductivity due to degradation of the gel composition, the urea-free formulations of the present disclosure showed improved stability after storage at 37° C. for 10 days.

TABLE 10

| Polymer | Conductivity (mS) | |
|---|---|---|
| | Initial | 10 days at 37° C. |
| 2.0% LPA with 7M Urea | 600 | 1490* |
| 2.0% LPA with 1.75M 1,3-Dimethylurea | 700 | 820 |
| 2.0% LPA with 1.75M 1,1-Dimethylurea | 870 | 1050 |
| 3.75% PDMA with 1.75M 1,3-Dimethylurea | 720 | 800 |

B. Gel Applications

Figure 11:
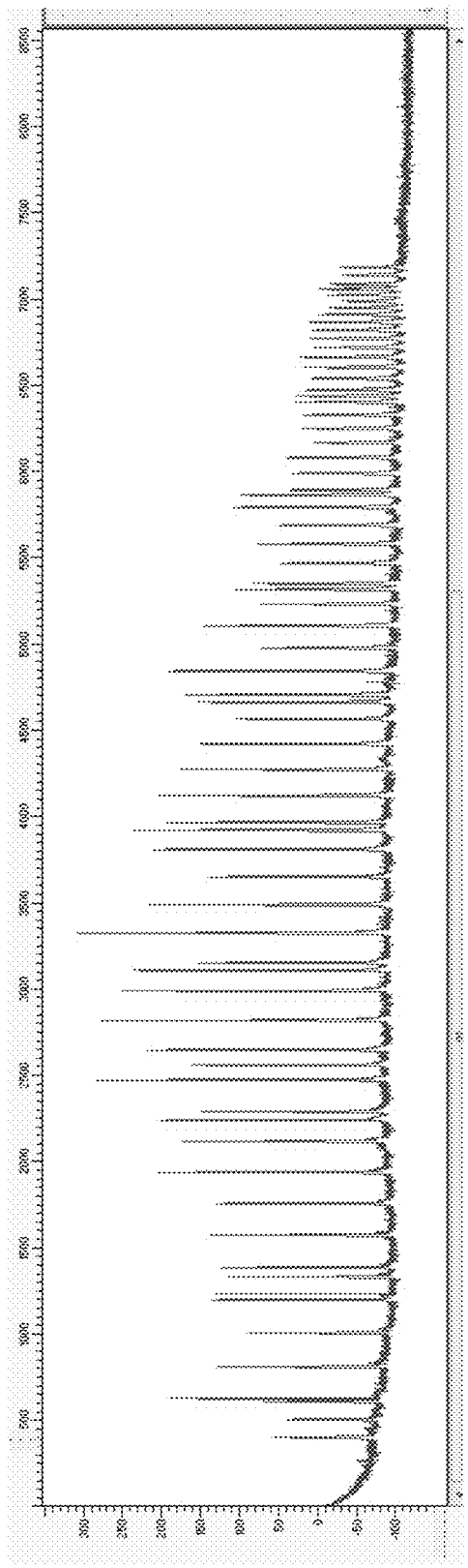
FIG. 11 shows the resolution obtained by capillary electrophoresis using a urea-free formulation of the disclosure prepared with 3.75 wt % polydimethylacrylamide and 1.75M 1,3-dimethylurea. Resolution is displayed for Applied Biosystems GeneScan™ 1200 LIZ™ dye Size Standard dye-labeled, single-stranded DNA fragments. Testing was carried out using an Applied Biosystems 3500 Genetic Analyzer using standard conditions.

The resolution during capillary electrophoresis using a formulation prepared with 3.75 wt % polydimethylacrylamide and 1.75M 1,3-dimethylurea as described above was tested using AppliedBiosystems GeneScan™ 1200 LIZ™ dye Size Standard dye-labeled, single-stranded DNA fragments. Testing was carried out using an AppliedBiosystems 3500 Genetic Analyzer under standard conditions. Results are shown in FIG. 11.

Figure 12B:
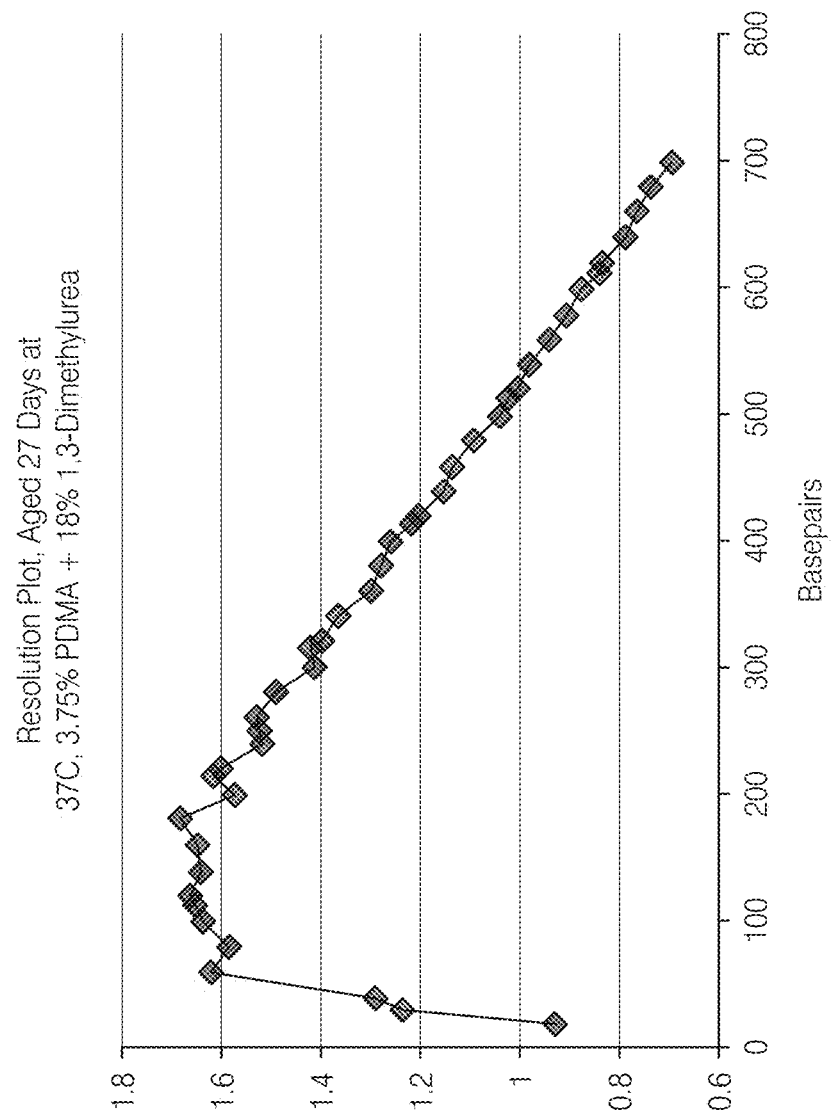
Figure 12C:
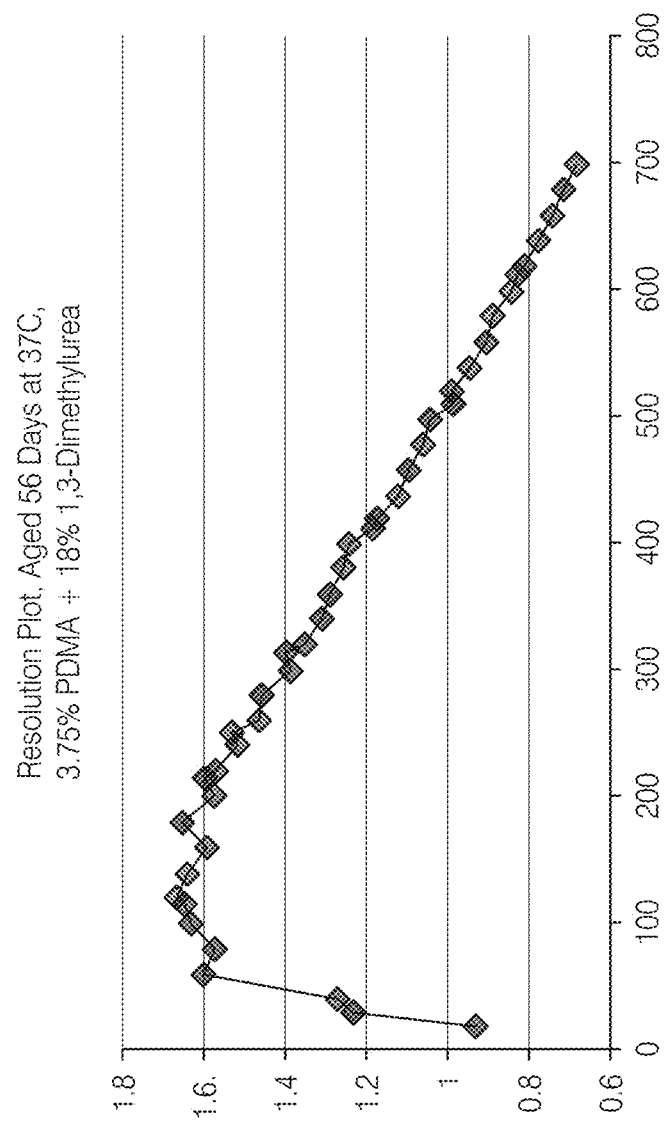

The reproducibility of resolution plots during capillary electrophoresis, and after aging of a formulation of the present disclosure prepared with 3.75% polydimethylacrylamide and 1.75M 1,3-dimethylurea as described above was tested. Resolution is displayed in FIGS. 12A-12C for the initial resolution before aging (FIG. 12A), and after aging at 37° C. for 27 days (FIG. 12B), and after aging at 37° C. for 56 days (FIG. 12C). AppliedBiosystems GeneScan™ 1200 LIZ™ dye Size Standard dye-labeled, single-stranded DNA fragments were used for the testing. Testing was carried out using an AppliedBiosystems 3500 Genetic Analyzer.

Table 11 Lists shows values for crossover and for the migration time for the 500 basepair fragment during capillary electrophoresis before and after aging of a formulation prepared with 3.75% polydimethylacrylamide and 1.75M 1,3-dimethylurea for up to 56 days at 37 C. Very little change in crossover and migration time was observed during the aging time. AppliedBiosystems GeneScan™ 1200 LIZ™ dye Size Standard dye-labeled, single-stranded DNA fragments was used for the testing. Testing was carried out using an AppliedBiosystems 3500 Genetic Analyzer under standard conditions.

TABLE 11

| Day at 37 C. | Crossover | Migration Time for 500 Basepair |
|---|---|---|
| 0 | 530 | 14.5 |
| 14 | 530 | 14 |
| 20 | 530 | 13.9 |
| 27 | 530 | 14 |
| 42 | 510 | 14.5 |
| 56 | 510 | 13.6 |

Figure 13:
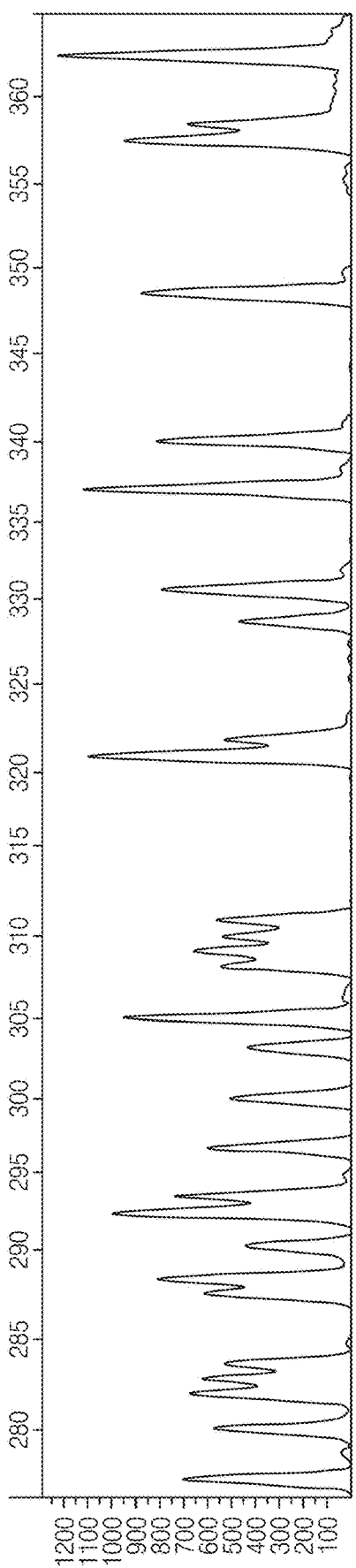
FIG. 13 shows the resolution obtained by capillary electrophoresis of a portion of Applied Biosystems BigDye® Terminator v3.1 sequencing standard using a formulation of the disclosure prepared with 2.0% polyacrylamide and 1.75M 1,3-dimethylurea. Testing was carried out using an Applied Biosystems 3500 Genetic Analyzer under standard conditions.

The resolution during capillary electrophoresis of a portion of AppliedBiosystems BigDye® Terminator v3.1 sequencing standard using a urea-free formulation of the present disclosure prepared with 2.0% polyacrylamide and 1.75M 1,3-dimethylurea as described above was tested using an AppliedBiosystems 3500 Genetic Analyzer under standard conditions. Results are shown in FIG. 13.

Figure 14:
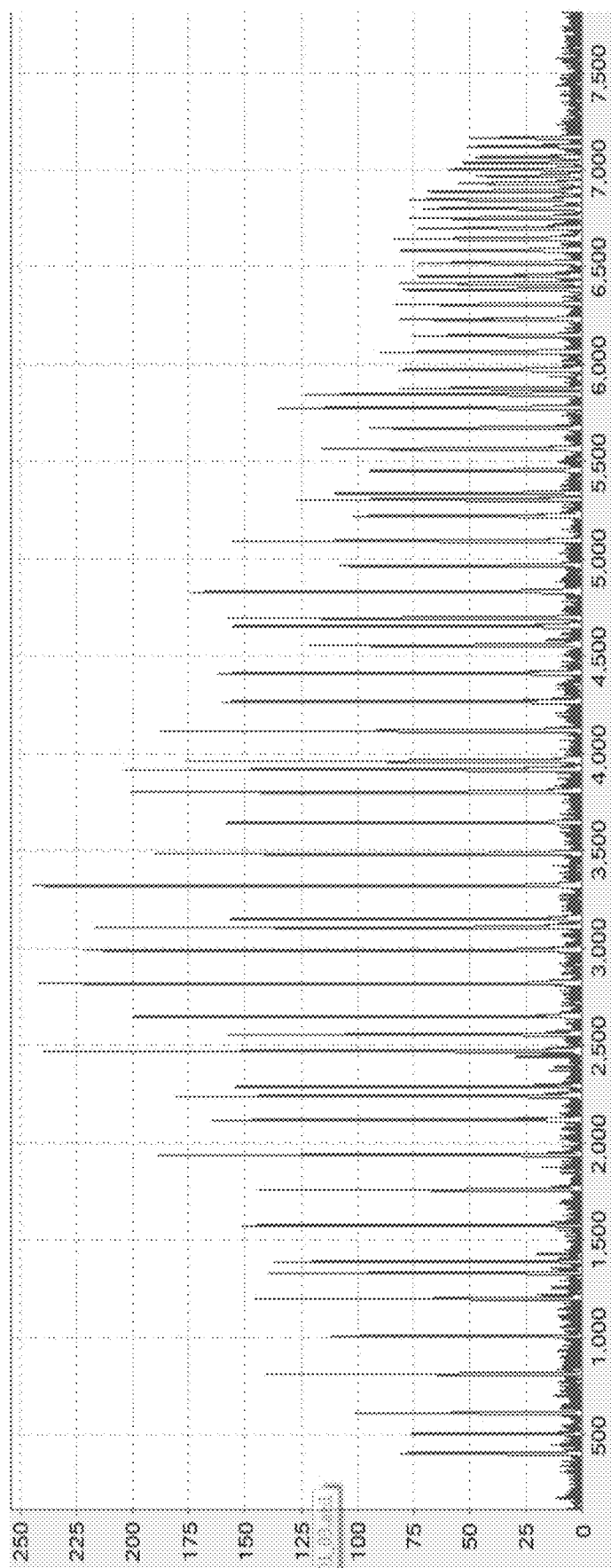
FIG. 14 shows the resolution obtained during capillary electrophoresis using a formulation of the disclosure prepared with 3.75 wt % polydimethylacrylamide and 1.75M 1,1-dimethylurea. Resolution is displayed for Applied Biosystems GeneScan™ 1200 LIZ™ dye Size Standard dye-labeled, single-stranded DNA fragments. Testing was carried out using an Applied Biosystems 3500 Genetic Analyzer under standard conditions.

The resolution during capillary electrophoresis using a urea-free formulation of the present disclosure prepared with 3.75 wt % polydimethylacrylamide and 1.75M 1,1-dimethylurea as described above was tested using AppliedBiosystems GeneScan™ 1200 LIZ™ dye Size Standard dye-labeled, single-stranded DNA fragments. Testing was carried out using an AppliedBiosystems 3500 Genetic Analyzer under standard conditions. Results are shown in FIG. 14.

Figure 15:
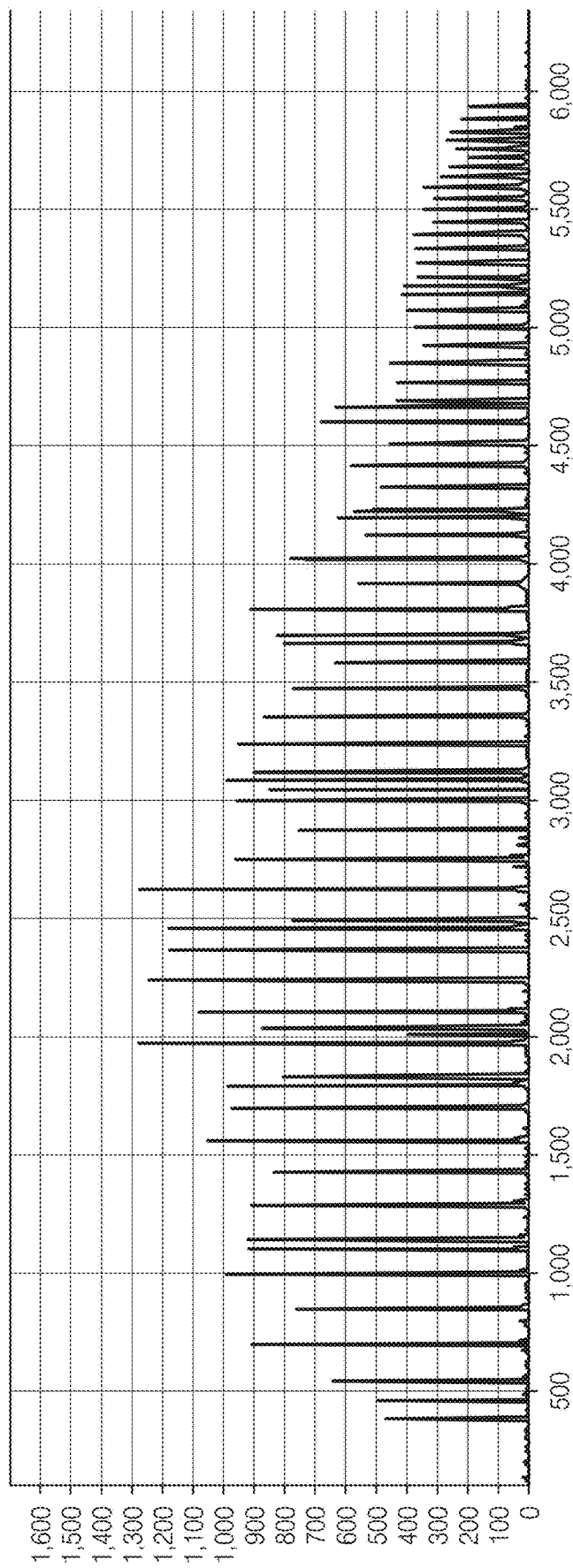
FIG. 15 shows the resolution obtained during capillary electrophoresis using a formulation prepared with 4.25 wt % polydimethylacrylamide and 15 wt % ethylurea. Resolution is displayed for Applied Biosystems GeneScan™ 1200 LIZ™ dye Size Standard dye-labeled, single-stranded DNA fragments. Testing was carried out using an Applied Biosystems 3500 Genetic Analyzer under standard conditions.

The resolution during capillary electrophoresis urea-free formulation of the present disclosure prepared with 4.25 wt % polydimethylacrylamide and 15 wt % ethylurea as described above was tested using AppliedBiosystems GeneScan™ 1200 LIZ™ dye Size Standard dye-labeled, single-stranded DNA fragments. Testing was carried out using an AppliedBiosystems 3500 Genetic Analyzer. Results are shown in FIG. 15.

Example 7

One uL of double-stranded DNA end-labeled with TAMRA (black peaks) is mixed with 1 uL single stranded size standard labeled with Liz (orange peaks) in 10 uL TE buffer. The sample mixture is injected into a single capillary CE instrument (Prism310; Thermo Fisher Scientific) and electrophoretically separated at 40° C. and 15 kV. The separation polymers consisted of (A) 2% LPA/0.08% pDMA/GA buffer/38% urea=POP7), or (B) 2% LPA/0.07% pDMA/GA buffer/10% sucrose.

Results: In the presence of the polymer formulation that contains the denaturant urea (16A and 17A) smaller peaks show peak splitting, the 340/350 bp peaks were not resolved, and larger size DNA fragments show peak broadening indicative of denaturation. The two smallest peaks (39/50 bp) were not resolved from the primer peak. The non-urea containing polymer formulation (16B and 17B) shows symmetrical, well resolved peaks across the analyzed size spectrum.

Example 8

A polymer solution consisting of 4.0% pDMA, ix GA buffer and 20% sucrose was kept at 37° C. and installed on a Genetic Analyzer 3500xl (Thermo Fisher Scientific) at Day 0 (A), and after 8 weeks (B) (and at other time points in between). One uL GlobalFiler was mixed with 1 uL Liz-labeled size standard and 10 uL formamide. The mixture was denatured for 5 minutes at 95° C. followed by cooling down to 4° C. Electrophoresis was performed at 60° C. and 15 kV running voltage.

Results: No significant change in separation of 1-bp alleles (circled), or peak broadening for the individual peaks of the Liz1200 size standard (bottom panels) as an indicator for loss in resolution were observed. Results are shown in FIGS. 18A-18D.

Example 9

One uL of the GeneRuler 1 kb Plus DNA Ladder (Thermo Fisher Scientific) at a concentration of 25 ng/uL was mixed with 10 uL of 1:1400 diluted Quant-iT PicoGreen dsDNA reagent (Thermo Fisher Scientific) Analysis was done with a separation polymer consisting of 4% pDMA, 1×GA buffer, 20% sucrose; electrophoresis was performed at 60 C and 19 kV.

Figure 19:
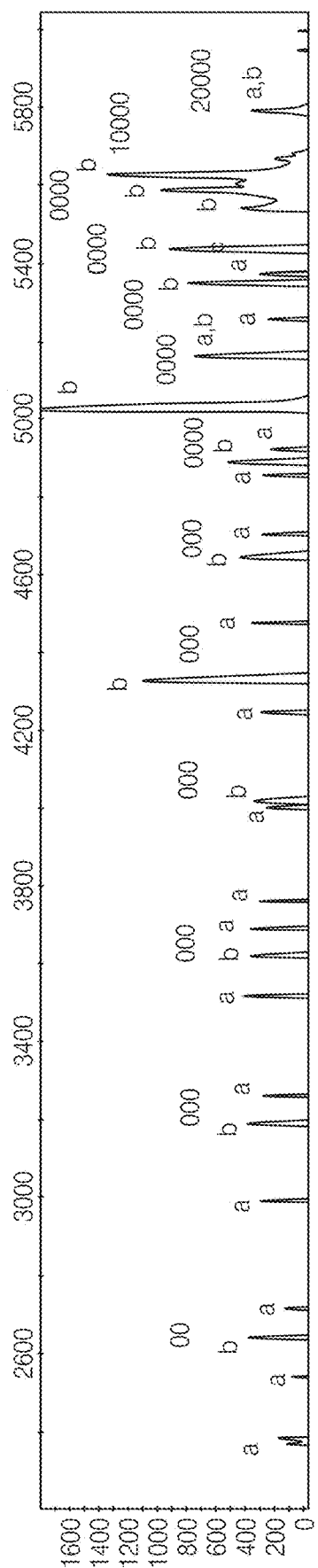
FIG. 19 shows the labeling and separation by capillary electrophoresis of all 15 GeneRuler dsDNA fragments ranging in size from 75 to 20,000 bp using a urea-free formulation of the disclosure. All fragments were efficiently labeled with the PicoGreen reagent and separated well in the sucrose containing polymer (peaks labeled "b" in the figure). The peaks labeled "a" in the figure are single-stranded DNA fragments labeled with the dye LIZ; these single-stranded DNA fragments do not interact with PicoGreen.

Results: All 15 GeneRuler dsDNA fragments ranging in size from 75 to 20,000 bp were efficiently labeled with the PicoGreen reagent and separated well in the sucrose containing polymer (peaks labeled "b"). The peaks labeled "a" show single-stranded DNA fragments labeled with the dye LIZ; these single-stranded DNA fragments do not interact with PicoGreen. Results are shown in FIG. 19.

Example 10

Figure 20A:
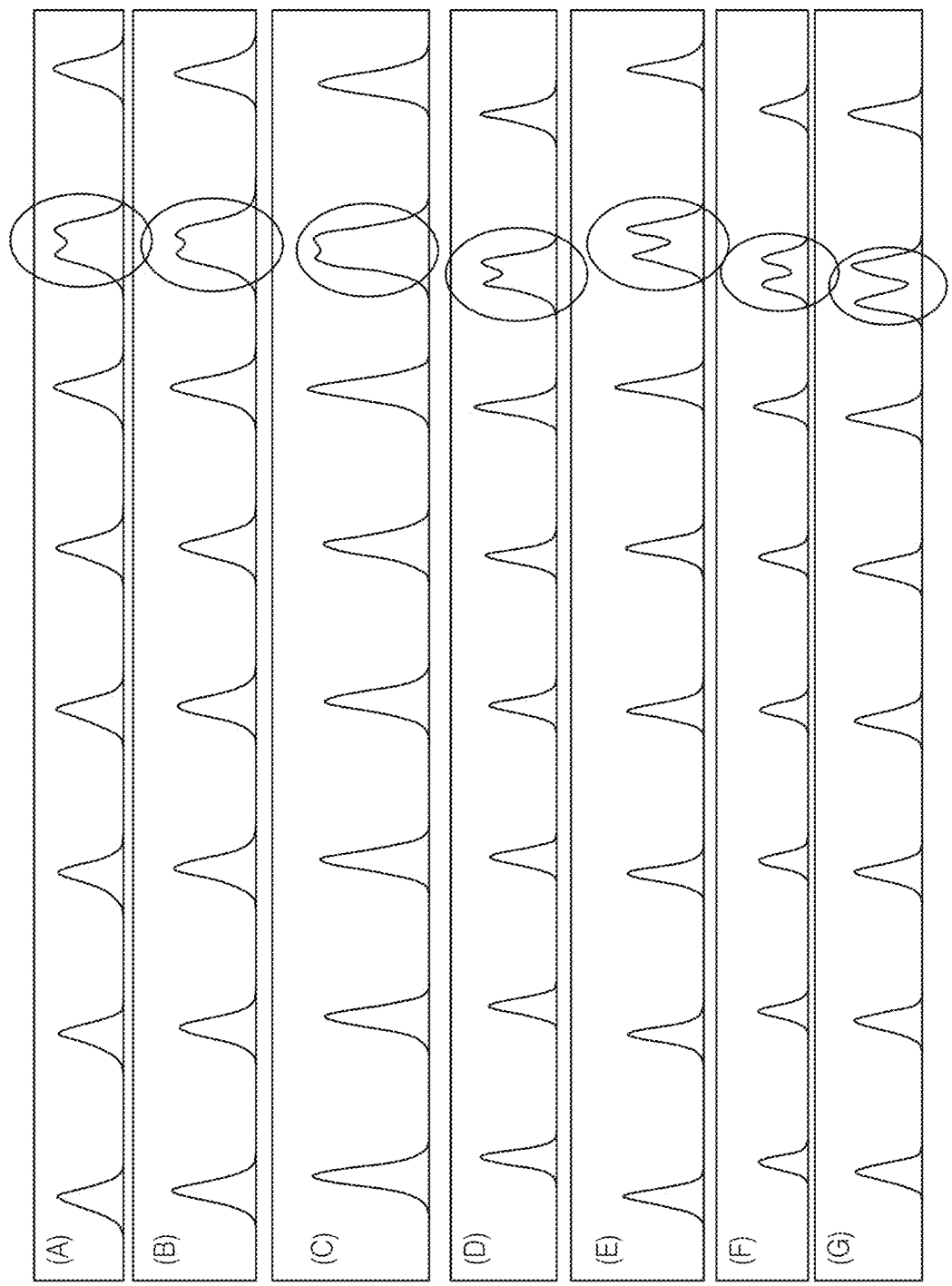
FIG. 20A and FIG. 20B show the analysis of the THO1 STR marker by capillary electrophoresis using urea-free formulations of the disclosure (FIG. 20A: 2.8% LPA containing polymer with or without sucrose.

The STR marker THO1 was separated in urea-free polymer formulations of the present disclosure in the presence or absence of sucrose. In (1) the LPA polymer concentration was held at 2.8% (FIG. 20A panels A, B, C) and sucrose was added to 10% (FIG. 20A panel D), 18% (FIG. 20A panel E), or 20% (FIG. 20A panel F). One uL of the THO1 STR marker was mixed with 10 uL formamide. This was followed by denaturation for 5 minutes at 95° C. followed by cooling down to 4° C. The sample separated in the non-sucrose containing formulation was subjected to electrophoresis at 65° C. at an electric field of 19.5 kV (FIG. 20A panel A), 14 kV (FIG. 20A panel B), and 10 kV (FIG. 20A panel C). Samples in formulations containing sucrose (FIG. 20A panels D-F) were electrophoresed at 65° C. and 19.5 kV. For comparison, the same sample was separated using the commercially available POP7 polymer (FIG. 20A panel G).

Figure 20B:
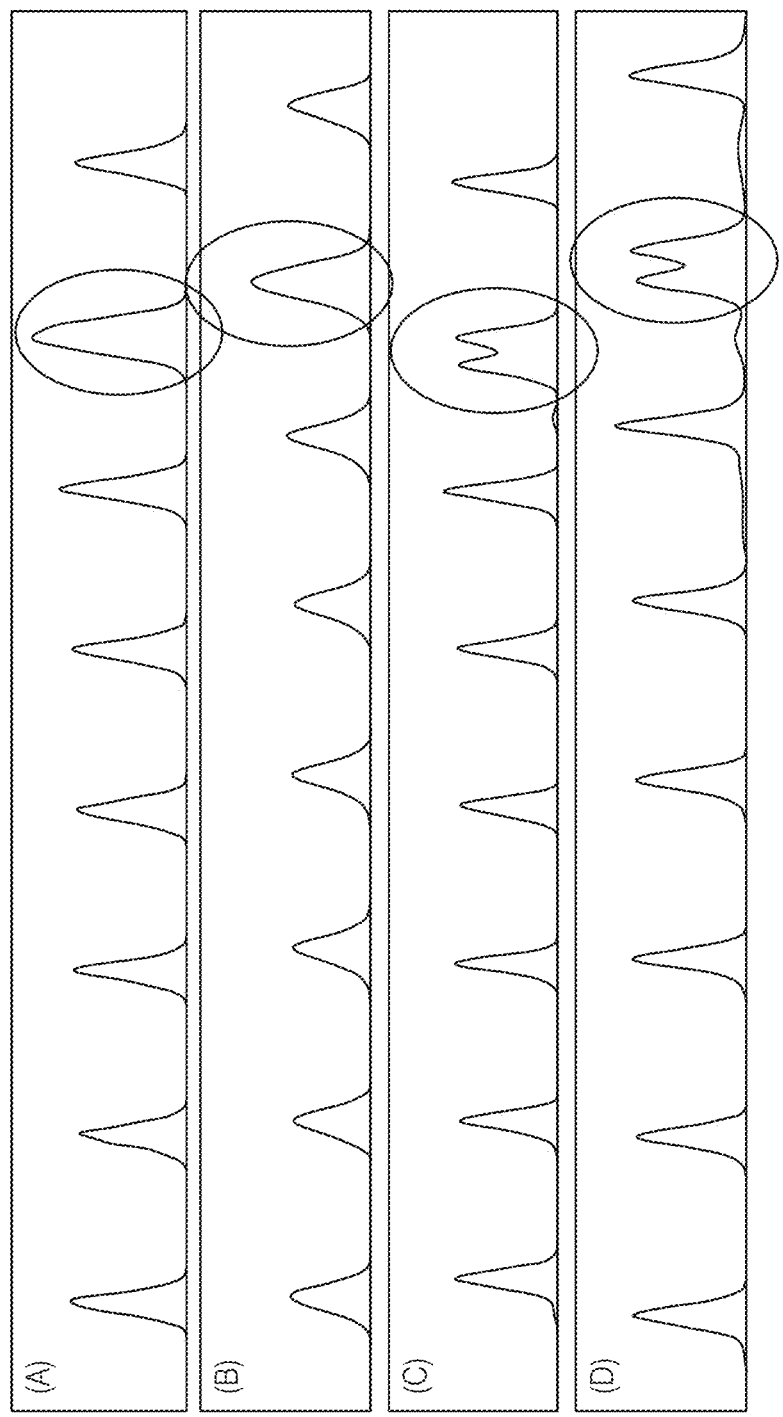

In (FIG. 20B) the LPA polymer concentration was held at 2.2% (FIG. 20B panels A and B,) and sucrose was added to 19% (FIG. 20B panel C), or 20% (FIG. 20B panel D). The sample was separated by electrophoresis at 65° C. at an electric field of 19.5 kV (FIG. 20B panel A) or 9 kV (FIG. 20B panel B) with the polymer in the absence of sucrose, or at 65° C. and 19.5 kV in both sucrose containing formulations. Note: The electric field was lowered in the non-sucrose containing formulations to demonstrate that a reduction in electrophoresis speed as observed in the presence of sucrose is not responsible for the improved resolution as observed in the presence of sucrose.

Results are shown in FIGS. 20A and 20B. The circled peak(s) indicate the alleles 9.1/10 of the THO1 STR marker that differ in size by 1 base. While with the 2.2% LPA containing polymer (FIG. 20B) in the absence of sucrose no separation of both alleles is observed (FIG. 20B panels A and B), both alleles are well resolved in the presence of 19%, or 20% sucrose (FIG. 20B panel C and D). With the 2.8% LPA formulation (FIG. 20A) some resolution of the 9.1/10 alleles is observed (FIG. 20A panels A-C), significantly better separation is observed in the presence of sucrose (FIG. 20A panels D-F). Here the separation of both alleles is comparable to the separation utilizing a commercially available polymer, containing urea as a denaturant (FIG. 20A panel G).

Example 11

Spatial calibration was performed on a 24-capillary array on a 3500xl Genetic Analyzer (Thermo Fisher Scientific) with the following polymer solutions (A) a commercial polymer formulation containing urea (POP7™), (B) 2.2% LPA, 0.07% pDMA, 1×GA buffer, 0% sucrose, (C) 2.2% LPA, 0.07% pDMA, 1×GA buffer, 10% sucrose, (D) 2.2% LPA, 0.07% pDMA, 1×GA buffer, 16% sucrose, (E) 2.2% LPA, 0.07% pDMA, 1×GA buffer, 18% sucrose, (F) 2.2% LPA, 0.07% pDMA, 1×GA buffer, 20% sucrose.

Results: Table 12 shows the relative signal intensity associated with each of the 24 capillaries of the array in response to the tested polymer formulation (A) to (F). The commercial polymer containing urea as a denaturant (A) shows a passing spectral with the average signal above the configured minimum of 3000 and relative even signal across all 24 capillaries with a % CV of 10.6. However, a similar formulation as (A) without urea fails all passing criteria with (1) a measured peak height of one more capillaries below the minimum threshold of 2000, (2) the measured average peak height of 1894 below the configured minimum of 3000, and (3) the measured signal non-uniformity of 0.355 is above the configured maximum of 0.2. Adding sucrose at increasing concentrations (C) to (F) still shows improving spatial calibrations for solutions containing sucrose at 10% (C), or 16% (D), where for formulation (C) a measured peak height of one more capillaries is below the minimum threshold of 2000, (2) the measured average peak height of 2239 is below the configured minimum of 3000, and (3) the measured signal non-uniformity of 0.252 is above the configured maximum of 0.2. For polymer formulation containing 16% sucrose (D) only the measured average peak height of 2734 is below the configured minimum of 3000. Polymer formulations containing 18% sucrose (E) or 20% sucrose (F) show all passing spatial calibration with signal uniformity as expressed by % CV significantly better than observed with commercial formulation (A).

TABLE 12

| Capillary Number | A | B | C | D | E | F |
| --- | --- | --- | --- | --- | --- | --- |
| 1 | 5435 | 3462 | 3398 | 3530 | 3576 | 3724 |
| 2 | 5599 | 2797 | 3047 | 3293 | 3281 | 3468 |
| 3 | 5782 | 2417 | 2878 | 3343 | 3347 | 3766 |
| 4 | 6068 | 2030 | 2501 | 3045 | 3053 | 3391 |
| 5 | 6266 | 1896 | 2275 | 2995 | 3206 | 3724 |
| 6 | 6218 | 1718 | 2184 | 2825 | 3133 | 3724 |
| 7 | 6475 | 1641 | 2120 | 2848 | 3205 | 3780 |

TABLE 12-continued

| Capillary Number | A | B | C | D | E | F |
|---|---|---|---|---|---|---|
| 8 | 6710 | 1622 | 2087 | 2673 | 3066 | 3632 |
| 9 | 6743 | 1361 | 1772 | 2368 | 3050 | 3572 |
| 10 | 6976 | 1432 | 1966 | 2382 | 2916 | 3560 |
| 11 | 7188 | 1361 | 1862 | 2417 | 2949 | 3503 |
| 12 | 6749 | 1303 | 1727 | 2387 | 2923 | 3639 |
| 13 | 6829 | 1410 | 1833 | 2170 | 2670 | 3333 |
| 14 | 6535 | 1157 | 1552 | 2031 | 2645 | 3234 |
| 15 | 6542 | 1363 | 1597 | 2472 | 2739 | 3340 |
| 16 | 6138 | 1426 | 1706 | 2287 | 2877 | 3464 |
| 17 | 5863 | 1367 | 1792 | 2363 | 2774 | 3306 |
| 18 | 5684 | 1463 | 1911 | 2499 | 3010 | 3480 |
| 19 | 5651 | 1612 | 1958 | 2627 | 2955 | 3440 |
| 20 | 5349 | 1830 | 2141 | 2555 | 2898 | 3300 |
| 21 | 5339 | 2113 | 2287 | 2811 | 3129 | 3399 |
| 22 | 5199 | 2385 | 2653 | 2926 | 3098 | 3426 |
| 23 | 5068 | 2808 | 2938 | 3188 | 3304 | 3466 |
| 24 | 5056 | 3502 | 3543 | 3587 | 3634 | 3725 |
| Average | 6061 | 1895 | 2239 | 2734 | 3060 | 3517 |
| StDev | 645 | 672 | 564 | 431 | 253 | 165 |
| % CV | 10.6 | 35.5 | 25.2 | 15.8 | 8.3 | 4.7 |

What is claimed is:

1. An electrophoresis separation medium comprising:
(a) a sieving component comprising at least one polymer or copolymer;
(b) a denaturant comprising one or more of methylurea, ethylurea, a dimethylurea, or a diethylurea, and
(c) an aqueous solvent or aqueous buffer;
wherein the electrophoresis separation medium exhibits functional stability for capillary electrophoresis after storage at a temperature of at least about 23° C. for at least 14 days.

2. The medium of claim 1, wherein the at least one polymer or copolymer is a non-crosslinked or sparsely cross-linked polymer or copolymer.

3. The medium of claim 1, wherein at least one polymer or copolymer is crosslinked.

4. The medium of claim 1, wherein the at least one polymer or copolymer is an uncharged water-soluble silica-adsorbing polymer or copolymer, a non-crosslinked acrylamide polymer or copolymer, a cellulose polymer or copolymer, a poly(alkylene oxide) polymer or copolymer, a polysaccharide, or a triblock copolymer.

5. The medium of claim 1, further comprising one or more of a compound capable of adjusting refractive index of the medium, a compound capable of slowing down the re-naturation kinetics of single-stranded DNA, or a compound capable of enhancing resolution of molecules by the medium.

6. The medium of claim 1, wherein the medium includes one or more agents selected from the group consisting of proline, histidine, betaine, trehalose, acetonitrile, imidazole, DMSO, N-methyl-2-pyrrolidinone, 3-(1-pyridinio)-1-propanesulfonate, 2-N,N,N-tri-n-butylammonium acetate, 1,3-dimethylurea, 1,3-diethylurea, 1,1-dimethylurea, and 1,1-diethylurea.

7. The medium of claim 1, further comprising a saccharide or its derivatives, a sugar alcohol or polyol or its derivatives, a sugar or a sugar isomer or its derivatives, a pentose sugar, a hexose sugar, a starch, a carbohydrate, or a starch hydrolysate.

8. The medium of claim 1, further comprising sucrose.

9. The medium of claim 8, wherein the sucrose is included at 10 wt. % to 50 wt. % of the medium.

10. The medium of claim 1, wherein the at least one polymer or copolymer comprises an N-substituted acrylamide polymer selected from the group consisting of N-substituted dimethylacrylamide, N-substituted diethylacrylamide, N-acryloyl-aminoethoxyethanol acrylamide, N-allyl glucose, and combinations thereof.

11. An electrophoresis separation medium comprising:
(a) a sieving component comprising at least one polymer or copolymer, wherein the at least one polymer or copolymer comprises an N-substituted acrylamide polymer selected from the group consisting of N-substituted dimethylacrylamide, N-substituted diethylacrylamide, N-acryloyl-aminoethoxyethanol acrylamide, N-allyl glucose, and combinations thereof;
(b) a denaturant comprising one or more of methylurea, ethylurea, a dimethylurea, or a diethylurea, and
(c) an aqueous solvent or aqueous buffer;
wherein the electrophoresis separation medium exhibits functional stability for capillary electrophoresis after storage at a temperature of at least about 23° C. for at least 14 days.

12. The medium of claim 11, wherein the at least one polymer or copolymer is a non-crosslinked or sparsely cross-linked polymer or copolymer.

13. The medium of claim 11, wherein at least one polymer or copolymer is crosslinked.

14. The medium of claim 11, wherein the medium further comprises one or more agents that are selected from the group consisting of proline, histidine, betaine, trehalose, acetonitrile, imidazole, DMSO, N-methyl-2-pyrrolidinone, 3-(1-pyridinio)-1-propanesulfonate, 2-N,N,N-tri-n-butylammonium acetate, 1,3-dimethylurea, 1,3-diethylurea, ethylurea, methylurea, 1,1-dimethylurea, and 1,1-diethylurea.

15. The medium of claim 11, further comprising sucrose included at 10 wt. % to 50 wt. % of the medium.

16. An electrophoresis separation medium comprising:
(a) a sieving component comprising at least one polymer or copolymer;
(b) sucrose included at 10 wt. % to 50 wt. % of the medium; and
(c) an aqueous solvent or aqueous buffer;
wherein the electrophoresis separation medium exhibits functional stability for capillary electrophoresis after storage at a temperature of at least about 23° C. for at least 14 days.

17. The medium of claim 16, wherein the at least one polymer or copolymer is a non-crosslinked or sparsely cross-linked polymer or copolymer.

18. The medium of claim 16, wherein at least one polymer or copolymer is crosslinked.

19. The medium of claim 16, wherein the at least one polymer or copolymer is an uncharged water-soluble silica-adsorbing polymer or copolymer, a non-crosslinked acrylamide polymer or copolymer, a cellulose polymer or copolymer, a poly(alkylene oxide) polymer or copolymer, a polysaccharide, or a triblock copolymer.

20. The medium of claim 16, further comprising one or more agents selected from the group consisting of proline, histidine, betaine, trehalose, acetonitrile, imidazole, DMSO, N-methyl-2-pyrrolidinone, 3-(1-pyridinio)-1-propanesulfonate, 2-N,N,N-tri-n-butylammonium acetate, 1,3-dimethylurea, 1,3-diethylurea, ethylurea, methylurea, 1,1-dimethylurea, and 1,1-diethylurea.

* * * * *